United States Patent [19]

Sharma et al.

[11] Patent Number: 5,546,395

[45] Date of Patent: Aug. 13, 1996

[54] DYNAMIC SELECTION OF COMPRESSION RATE FOR A VOICE COMPRESSION ALGORITHM IN A VOICE OVER DATA MODEM

[75] Inventors: Raghu N. Sharma, North Oaks; Jeffrey P. Davis, Ham Lake; Timothy D. Gunn, Mounds View; Ping Li, New Brighton, all of Minn.; Sidhartha Maitra; Ashish A. Thanawala, both of Saratoga, Calif.

[73] Assignee: Multi-Tech Systems, Inc., Mounds View, Minn.

[21] Appl. No.: 346,421

[22] Filed: Nov. 29, 1994

Related U.S. Application Data

[63] Continuation-in-part of Ser. No. 271,496, Jul. 7, 1994, and a continuation-in-part of Ser. No. 2,467, Jan. 8, 1993, Pat. No. 5,452,289.

[51] Int. Cl.⁶ .................................. H04J 3/22; G10L 5/00
[52] U.S. Cl. ........................... 370/84; 370/118; 370/112; 375/246; 395/2.28
[58] Field of Search ......................... 370/94.1, 110.1, 370/118, 112, 79, 76, 82, 84, 24; 395/2, 2.2, 2.21, 2.28, 2.3, 2.31; 381/29, 32, 36, 30, 41; 375/245, 246; 455/72; 341/51

[56] References Cited

U.S. PATENT DOCUMENTS

| Re. 34,034 | 8/1992 | O'Sullivan | 379/59 |
|---|---|---|---|
| 3,304,372 | 2/1967 | Filipowsky et al. | |
| 3,789,165 | 1/1974 | Campanella et al. | 179/170 |
| 3,904,830 | 9/1975 | Every, Sr. et al. | |
| 3,973,081 | 8/1976 | Hutchins | 395/2.28 |
| 3,997,732 | 12/1976 | Every, Sr. et al. | 179/18 |
| 4,100,377 | 7/1978 | Flanagan | 179/15 |
| 4,107,471 | 8/1978 | Reed | 179/15 |

(List continued on next page.)

FOREIGN PATENT DOCUMENTS

| 488865A2 | 6/1992 | European Pat. Off. |
| 63-054052 | 8/1988 | Japan. |
| 2210237 | 1/1989 | United Kingdom. |

OTHER PUBLICATIONS

European Search Report for Application No. EP 93403164 completed on Sep. 21, 1995 by Examiner Lambley; 4 pages.
S. Casale et al., "Statistical Voice/High–Speed Data Multiplexing on a 64 KBIT/S Channel," IEEE, pp. 459–464, dated 1991.
T. Komiya et al, "An Approach to the Multifunction Graphic Terminal for the ISDN Environment", IEEE, pp. 32–36, dated 1988.

(List continued on next page.)

*Primary Examiner*—Wellington Chin
*Assistant Examiner*—Chau T. Nguyen
*Attorney, Agent, or Firm*—Schwegman, Lundberg, Woessner & Kluth, P.A.

[57] ABSTRACT

The present invention includes software and hardware components to enable digital data communication over standard telephone lines. The present invention converts analog voice signals to digital data, compresses that data and places the compressed speech data into packets for transfer over the telephone lines to a remote site. A voice control digital signal processor (DSP) operates to use one of a plurality of speech compression algorithms which produce a scaleable amount of compression. The rate of compression is inversely proportional to the quality of the speech the compression algorithm is able to reproduce. The higher the compression, the lower the reproduction quality. The selection of the rate of compression is dependent on such factors as the speed or data bandwidth on the communications connection between the two sites, the data demand between the sites and amount of silence detected in the speech signal. The voice compression rate is dynamically changed as the aforementioned factors change. A negotiation handshake protocol is described which enables the two sites to negotiate the compression rate based on such factors.

4 Claims, 7 Drawing Sheets

U.S. PATENT DOCUMENTS

| | | | |
|---|---|---|---|
| 4,205,202 | 5/1980 | Kahn | 370/81 |
| 4,284,850 | 8/1981 | Clingenpeel | 370/81 |
| 4,354,273 | 10/1982 | Araseki et al. | 375/245 |
| 4,377,860 | 3/1983 | Godbole | 370/84 |
| 4,403,322 | 9/1983 | Kato et al. | 370/110 |
| 4,425,661 | 1/1984 | Moses et al. | 375/1 |
| 4,445,213 | 4/1984 | Baugh et al. | 370/94 |
| 4,476,559 | 10/1984 | Brolin et al. | 370/110 |
| 4,479,195 | 10/1984 | Herr et al. | 364/900 |
| 4,479,213 | 10/1984 | Galand et al. | 370/118 |
| 4,495,620 | 1/1985 | Steele et al. | 370/118 |
| 4,500,987 | 2/1985 | Hasegawa | 370/60 |
| 4,524,244 | 6/1985 | Faggin et al. | |
| 4,534,024 | 8/1985 | Maxemchuk et al. | 370/85 |
| 4,546,212 | 10/1985 | Crowder, Sr. | 179/2 |
| 4,578,537 | 3/1986 | Faggin et al. | 179/2 |
| 4,587,651 | 5/1986 | Nelson et al. | 370/88 |
| 4,593,389 | 6/1986 | Wurzburg et al. | 370/110 |
| 4,609,788 | 9/1986 | Miller et al. | 179/170.6 |
| 4,629,829 | 12/1986 | Puhl et al. | 379/58 |
| 4,652,703 | 3/1987 | Lu et al. | 379/339 |
| 4,660,218 | 4/1987 | Hashimoto | 379/93 |
| 4,670,874 | 6/1987 | Sato et al. | 370/110.1 |
| 4,697,281 | 9/1987 | O'Sullivan | 379/59 |
| 4,700,341 | 10/1987 | Huang | 370/80 |
| 4,707,831 | 11/1987 | Weir et al. | 370/94 |
| 4,718,082 | 1/1988 | Parker et al. | 379/98 |
| 4,740,963 | 4/1988 | Eckley | 370/110.1 |
| 4,750,169 | 6/1988 | Carse et al. | 370/109 |
| 4,751,510 | 6/1988 | De Saint Michel et al. | 340/825.07 |
| 4,751,736 | 6/1988 | Gupta et al. | 395/2.21 |
| 4,757,527 | 7/1988 | Beniston et al. | 379/410 |
| 4,764,955 | 8/1988 | Galand et al. | 379/411 |
| 4,807,250 | 2/1989 | Tanaka | 375/245 |
| 4,809,271 | 2/1989 | Kondo et al. | 370/110.1 |
| 4,813,040 | 3/1989 | Futato | 370/111 |
| 4,827,085 | 5/1989 | Yaniv et al. | 178/18 |
| 4,835,765 | 5/1989 | Bergmans et al. | 370/32 |
| 4,839,802 | 6/1989 | Wonak et al. | 364/200 |
| 4,845,746 | 7/1989 | Li | 379/411 |
| 4,847,900 | 7/1989 | Wakim | 379/424 |
| 4,862,449 | 8/1989 | Hoefkens et al. | 370/32 |
| 4,866,732 | 9/1989 | Carey et al. | 375/1 |
| 4,887,265 | 12/1989 | Felix | 370/94.1 |
| 4,890,282 | 12/1989 | Lambert et al. | 370/79 |
| 4,901,333 | 2/1990 | Hodgkiss | 375/98 |
| 4,905,282 | 2/1990 | McGlynn et al. | 380/48 |
| 4,912,758 | 3/1990 | Arbel | 379/388 |
| 4,914,650 | 4/1990 | Sriram | 370/60 |
| 4,926,448 | 5/1990 | Kraul et al. | 375/121 |
| 4,932,048 | 6/1990 | Kenmochi et al. | 379/67 |
| 4,935,954 | 6/1990 | Thompson et al. | 379/89 |
| 4,942,569 | 7/1990 | Maeno | 370/60 |
| 4,953,210 | 8/1990 | McGlynn et al. | 380/48 |
| 4,965,789 | 10/1990 | Bottau et al. | 370/79 |
| 4,972,457 | 11/1990 | O'Sullivan | 379/59 |
| 4,972,462 | 11/1990 | Shibata | 379/89 |
| 4,972,483 | 11/1990 | Carey | 395/2.21 |
| 4,977,591 | 12/1990 | Chen et al. | 379/410 |
| 4,991,169 | 2/1991 | Davis et al. | 370/77 |
| 4,995,059 | 2/1991 | Ishikawa | 375/27 |
| 4,998,241 | 3/1991 | Brox et al. | 370/32.1 |
| 5,001,710 | 3/1991 | Gawrys et al. | 370/110.1 |
| 5,001,745 | 3/1991 | Pollock | 379/96 |
| 5,005,183 | 4/1991 | Carey et al. | 375/1 |
| 5,008,926 | 4/1991 | Misholi | 379/89 |
| 5,014,232 | 5/1991 | André | 364/724 |
| 5,020,058 | 5/1991 | Holden et al. | 370/109 |
| 5,036,513 | 7/1991 | Greenblatt | 370/125 |
| 5,044,010 | 8/1991 | Frenkiel et al. | 379/61 |
| 5,046,188 | 9/1991 | Molnar | 379/94 |
| 5,051,720 | 9/1991 | Kittirutsunetorn | 340/310 |
| 5,062,133 | 10/1991 | Melrose | 379/94 |
| 5,065,425 | 11/1991 | Lecomte et al. | 379/93 |
| 5,081,647 | 1/1992 | Bremer | 375/5 |
| 5,083,310 | 1/1992 | Drory | 395/2.21 |
| 5,086,471 | 2/1992 | Tanaka et al. | 381/36 |
| 5,099,472 | 3/1992 | Townsend et al. | 370/32.1 |
| 5,107,519 | 4/1992 | Ishikawa | 375/27 |
| 5,115,429 | 5/1992 | Hluchyj et al. | 370/94.1 |
| 5,121,385 | 6/1992 | Tominaga et al. | 370/80 |
| 5,127,001 | 6/1992 | Steagall et al. | 370/62 |
| 5,127,041 | 6/1992 | O'Sullivan | 379/59 |
| 5,132,966 | 7/1992 | Hayano et al. | 370/79 |
| 5,136,586 | 8/1992 | Greenblatt | 370/110 |
| 5,138,662 | 8/1992 | Amano et al. | 395/2.28 |
| 5,146,470 | 9/1992 | Fujii et al. | 375/103 |
| 5,150,410 | 9/1992 | Bertrand | 380/28 |
| 5,151,937 | 9/1992 | Chujo et al. | 379/410 |
| 5,153,897 | 10/1992 | Sumiyoshi et al. | 375/8 |
| 5,162,812 | 11/1992 | Aman et al. | 375/34 |
| 5,177,734 | 1/1993 | Cummiskey et al. | 370/32 |
| 5,182,762 | 1/1993 | Shirai et al. | 375/122 |
| 5,187,591 | 2/1993 | Guy et al. | 358/425 |
| 5,187,692 | 2/1993 | Haneda et al. | 367/135 |
| 5,193,110 | 3/1993 | Jones et al. | 379/94 |
| 5,195,130 | 3/1993 | Weiss et al. | 379/90 |
| 5,208,812 | 5/1993 | Dudek et al. | 370/100.1 |
| 5,208,850 | 5/1993 | Kino | 379/88 |
| 5,214,656 | 5/1993 | Chung et al. | 371/43 |
| 5,228,026 | 7/1993 | Albrow et al. | 370/29 |
| 5,233,660 | 8/1993 | Chen | 381/38 |
| 5,235,595 | 8/1993 | O'Dowd | 370/94.1 |
| 5,249,218 | 9/1993 | Sainton | 379/59 |
| 5,258,983 | 11/1993 | Lane et al. | 370/118 |
| 5,261,027 | 11/1993 | Taniguchi et al. | 395/2 |
| 5,263,019 | 11/1993 | Chu | 370/32 |
| 5,272,695 | 12/1993 | Makino et al. | 370/32.1 |
| 5,276,703 | 1/1994 | Budin et al. | 375/1 |
| 5,278,900 | 1/1994 | Van Gerwen et al. | 379/410 |
| 5,282,197 | 1/1994 | Kreitzer | 370/76 |
| 5,283,638 | 2/1994 | Engberg et al. | 348/14 |
| 5,283,819 | 2/1994 | Glick et al. | 379/90 |
| 5,289,539 | 2/1994 | Maruyama | 379/410 |
| 5,295,136 | 3/1994 | Ashley et al. | 370/32 |
| 5,305,312 | 4/1994 | Fornek et al. | 370/62 |
| 5,307,413 | 4/1994 | Denzer | 380/49 |
| 5,309,562 | 5/1994 | Li | |
| 5,313,498 | 5/1994 | Sano | 375/103 |
| 5,317,604 | 5/1994 | Osterweil | 375/122 |
| 5,319,682 | 6/1994 | Clark | 375/122 |
| 5,327,520 | 7/1994 | Chen | 395/2 |
| 5,329,472 | 7/1994 | Sugiyama | 364/724 |
| 5,341,374 | 8/1994 | Lewen et al. | 370/85.4 |
| 5,343,473 | 8/1994 | Cidon et al. | 370/85.6 |
| 5,343,521 | 8/1994 | Jullien et al. | 379/410 |
| 5,371,853 | 12/1994 | Kao et al. | 395/2.32 |
| 5,406,560 | 4/1995 | Kondo et al. | 375/245 |
| 5,414,796 | 5/1995 | Jacobs | 395/2.3 |

OTHER PUBLICATIONS

D. Gulick et al., "Interface for the ISDN to Your PC with A Voice/Data Board", *Electronic Design*, pp. 85–88, dated Dec. 10, 1987.

S. Sasaki et al., "Variable Rate Voice Coding System", IEEE, pp. 364–367, dated 1992.

AT&T Microelectronics, "High Speed Data Pump Chip Sets", published in Dec. 1991.

AT&T Microelectronics, "WE DSP16C Digital Signal Processor/CODEC Preliminary Data Sheet", 32 pages, May published in 1991.

AT&T Microelectronics, "T7540 Digital Telephone CODEC Data Sheet Addendum", pp. 1–4, published in Jul., 1991.

AT&T Microelectronics, "T7540 Digital Telephone CODEC Preliminary Data Sheet", pp. 1–64, published in Jan., 1991.

Zilog Intelligent Peripheral Controllers, "Z84C01 Z80 CPU with Clock Generator/Controller," pp. 43–73, published in 1991.

Zilog Intelligent Peripheral Controllers, "Z84C90 CMOS Z80 KIO Serial/Parallel/counter/timer," pp. 205–224, published in 1991.

U.S. West Caller ID publication, received Jul. 18, 1994, one page.

J. D. Mills, et al., "A Data and Boice System for the General Service Telephone Network," *IECON*, pp. 1143–1148, 1987.

Copy of European Search Report (Application No. EP 94304742), completed Jun. 8, 1995 by Examiner Mikkelsen.

"TechTips—A Periodic Round–up of Technical Applications, Notes, and Information on MultiTech's Data Communications Products" by MultiTech Systems, vol. 2, No. 2, May 1992.

"MultiX25—X.25 PAD, The New MultiX25 PAD 8 Port X.25 Packet Assembler/Disassembler for Public and Private Data Networks," by MultiTech Systems. Mar. 1992 (2 pages).

Y. Akaiwa et al., "An Integrated Voice and Data Radio Access System," 1992, pp. 255–258, IEEE.

CCITT V.42, "Error–Correcting Procedures for DCES Using Asynchronous–to–Synchronous Conversion", vol. VIII, pp. 296–370, dated 1988.

5,546,395

DYNAMIC SELECTION OF COMPRESSION RATE FOR A VOICE COMPRESSION ALGORITHM IN A VOICE OVER DATA MODEM

This patent application is a Continuation-In-Part of U.S. patent application Ser. No. 08/271,496 filed Jul. 7, 1994 entitled "VOICE OVER DATA MODEM WITH SELECTABLE VOICE COMPRESSION", the complete application of which is hereby incorporated by reference, and also U.S. patent application Ser. No. 08/002,467 filed Jan. 8, 1993, now issued as U.S. Pat. No. 5,452,289 on Sep. 19, 1995 entitled "COMPUTER-BASED MULTIFUNCTION PERSONAL COMMUNICATIONS SYSTEM", the complete application of which, including the microfiche appendix, is also hereby incorporated by reference.

A microfiche appendix is included in the application, 1 microfiche and 92 pages.

FIELD OF THE INVENTION

The present invention relates to communications systems and in particular to modem communications having simultaneous digitized voice and data capabilities.

BACKGROUND OF THE INVENTION

Simultaneous voice and modem data transmitted over the same communications link between two sites has been accomplished in several ways. The most common communications link used between two sites is the telephone line. The most common data handling equipment to communicate over a communications link is the computer modem which modulates digital data onto a carrier for transmission in the voice band of the telephone line. A wide variety of modulation standards have been promulgated by such international groups as the CCITT for communication in the voice band. The data bandwidth for such modulation standards is typically fixed and the throughput rate of data is also assumed to be fixed.

In some modulations standards, there are provisions for changing the modulation data rate based on the quality of the communications link. For example, in a noisy telephone line, a 9600 baud modulation rate may have such a high bit error rate that the modulation must be changed to a 2400 baud connection. This is done in a handshake communication protocol between the two sites when the communications link simply cannot support the higher rate.

There is a need in the art, however, for an efficient and cost effective way of maximizing bandwidth over the communications link between two sites to enable the simultaneous transmission of voice and data. There is a need, therefore, to negotiate the data bandwidth between the sites, negotiate the compression rate for the voice compression algorithms used to compress the voice and there is a need to allocate and reallocate the ratio of compress voice to digital data transmitted over the communications link.

SUMMARY OF THE INVENTION

The present invention solves the aforementioned problems and shortcoming of the existing art and solves other problems not listed above which will become apparent to those skilled in the art upon reading and understanding the present specification and claims. The present invention describes a voice over data modem which allows the operator to simultaneously transmit voice and data communication to a remote site. This voice over data function dynamically allocates data bandwidth over the telephone line depending on the demands of the voice grade digitized signal and the modulation speed of the communication link between the two sites.

The present invention includes software and hardware components to enable digital data communication over standard telephone lines. The present invention converts analog voice signals to digital data, compresses that data and places the compressed speech data into packets for transfer over the telephone lines to a remote site. A voice control digital signal processor (DSP) operates to use one of a plurality of speech compression algorithms which produce a scaleable amount of compression. The rate of compression is inversely proportional to the quality of the speech the compression algorithm is able to reproduce. The higher the compression, the lower the reproduction quality. The selection of the rate of compression is dependant on such factors as the speed or data bandwidth on the communications connection between the two sites, the data demand between the sites and amount of silence detected in the speech signal. The voice compression rate is dynamically changed as the aforementioned factors change. A negotiation handshake protocol is described which enables the two sites to negotiate the compression rate based on such factors.

DESCRIPTION OF THE DRAWINGS

In the drawings, where like numerals describe like components throughout the several views.

DETAILED DESCRIPTION OF THE PREFERRED EMBODIMENTS

The specification for the multiple inventions described herein includes the present description, the drawings and a microfiche appendix. In the following detailed description of the preferred embodiment, reference is made to the accompanying drawings which form a part hereof, and in which is shown by way of illustration specific embodiments in which the inventions may be practiced. These embodiments are described in sufficient detail to enable those skilled in the art to practice the invention, and it is to be understood that other embodiments may be utilized and that structural changes may be made without departing from the spirit and scope of the present inventions. The following detailed description is, therefore, not to be taken in a limiting sense, and the scope of the present inventions is defined by the appended claims.

Figure 1:
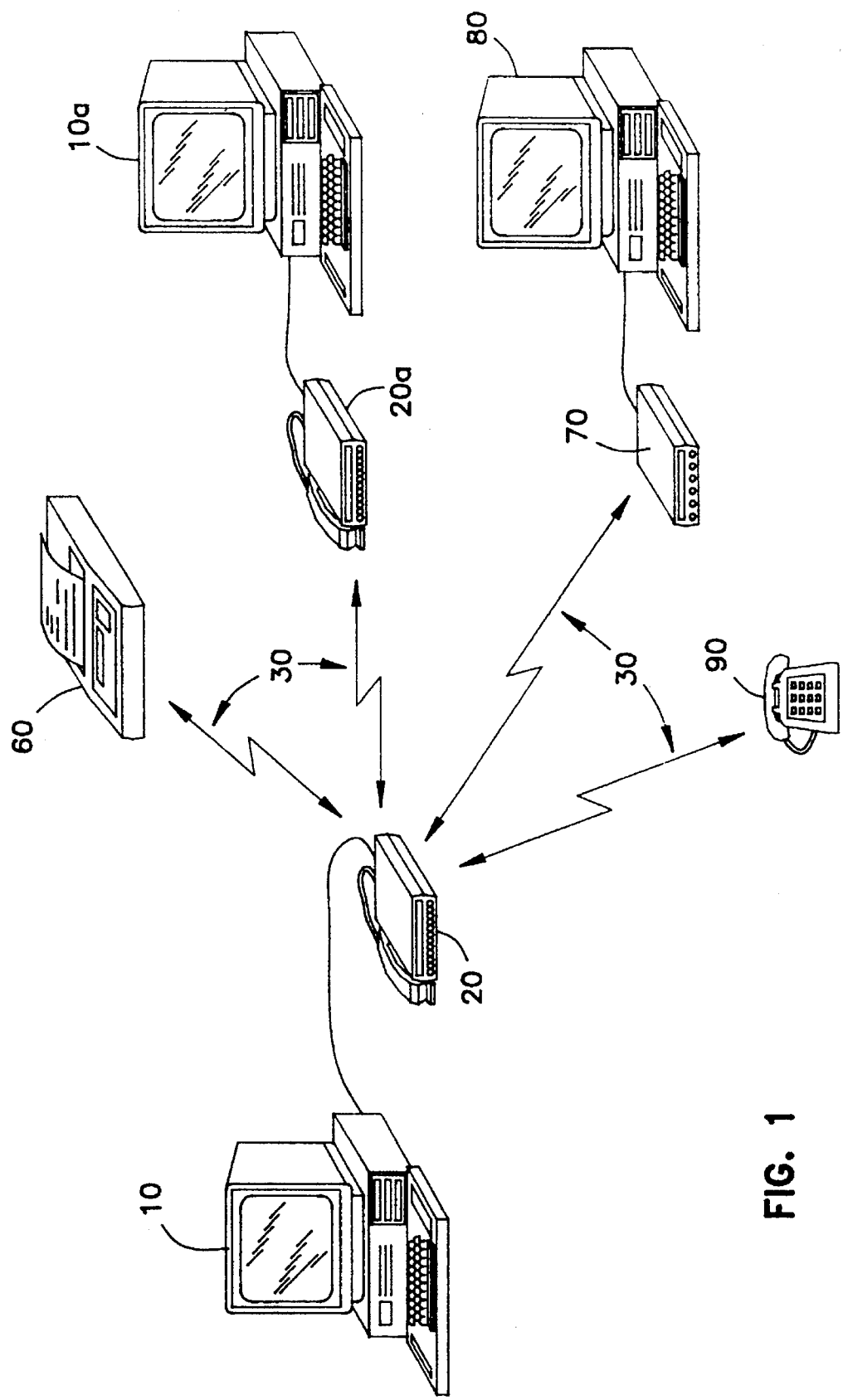
FIG. 1 shows the telecommunications environment within which the present may operate in several of the possible modes of communication.

FIG. 1 shows a typical arrangement for the use of the present system. Personal computer 10 is running the software components of the present system while the hardware components 20 include the data communication equipment and telephone headset. Hardware components 20 communicate over a standard telephone line 30 to one of a variety of remote sites. One of the remote sites may be equipped with the present system including hardware components 20a and software components running on personal computer 10a. In one alternative use, the local hardware components 20 may be communicating over standard telephone line 30 to facsimile machine 60. In another alternative use, the present system may be communicating over a standard telephone line 30 to another personal computer 80 through a remote modem 70. In another alternative use, the present system may be communicating over a standard telephone line 30 to a standard telephone 90. Those skilled in the art will readily recognize the wide variety of communication interconnections possible with the present system by reading and understanding the following detailed description.

The ornamental features of the hardware components 20 of FIG. 1 are claimed as part of Design Patent Application Number 29/001368, filed Nov. 12, 1992 entitled "Telephone/Modem case for a Computer-Based Multifunction Personal Communications System" assigned to the same assignee of the present inventions and hereby incorporated by reference.

General Overview

The present inventions are embodied in a commercial product by the assignee, MultiTech Systems, Inc. The software component operating on a personal computer is sold under the commercial trademark of MultiExpressPCS™ personal communications software while the hardware component of the present system is sold under the commercial name of MultiModemPCS™, Intelligent Personal Communications System Modem. In the preferred embodiment, the software component runs under Microsoft® Windows™ however those skilled in the art will readily recognize that the present system is easily adaptable to run under any single or multi-user, single or multi-window operating system.

The present system is a multifunction communication system which includes hardware and software components. The system allows the user to connect to remote locations equipped with a similar system or with modems, facsimile machines or standard telephones over a single analog telephone line. The software component of the present system includes a number of modules which are described in more detail below.

The telephone module allows the system to operate as a conventional or sophisticated telephone system. The system converts voice into a digital signal so that it can be transmitted or stored with other digital data, like computer information. The telephone function supports PBX and Centrex features such a call waiting, call forwarding, caller ID and three-way calling. This module also allows the user to mute, hold or record a conversation. The telephone module enables the handset, headset or hands-free speaker telephone operation of the hardware component. It includes on-screen push button dialing, speed-dial of stored numbers and digital recording of two-way conversations.

The voice mail portion of the present system allows this system to operate as a telephone answering machine by storing voice messages as digitized voice files along with a time/date voice stamp. The digitized voice files can be saved and sent to one or more destinations immediately or at a later time using a queue scheduler. The user can also listen to, forward or edit the voice messages which have been received with a powerful digital voice editing component of the present system. This module also creates queues for outgoing messages to be sent at preselected times and allows the users to create outgoing messages with the voice editor.

The fax manager portion of the present system is a queue for incoming and outgoing facsimile pages. In the preferred embodiment of the present system, this function is tied into the Windows "print" command once the present system has been installed. This feature allows the user to create faxes from any Windows®-based document that uses the "print" command. The fax manager function of the present system allows the user to view queued faxes which are to be sent or which have been received. This module creates queues for outgoing faxes to be sent at preselected times and logs incoming faxes with time/date stamps.

The multi-media mail function of the present system is a utility which allows the user to compose documents that include text, graphics and voice messages using the message composer function of the present system, described more fully below. The multi-media mail utility of the present system allows the user to schedule messages for transmittal and queues up the messages that have been received so that can be viewed at a later time.

The show and tell function of the present system allows the user to establish a data over voice (DOV) communications session. When the user is transmitting data to a remote location similarly equipped, the user is able to talk to the person over the telephone line while concurrently transferring the data. This voice over data function is accomplished in the hardware components of the present system. It digitizes the voice and transmits it in a dynamically changing allocation of voice data and digital data multiplexed in the same transmission. The allocation at a given moment is selected depending on the amount of voice digital information required to be transferred. Quiet voice intervals allocate greater space to the digital data transmission.

The terminal function of the present system allows the user to establish a data communications session with another computer which is equipped with a modem but which is not equipped with the present system. This feature of the present system is a Windows™-based data communications program that reduces the need for issuing "AT" commands by providing menu driven and "pop-up" window alternatives.

The address book function of the present system is a database that is accessible from all the other functions of the present system. This database is created by the user inputting destination addresses and telephone numbers for data communication, voice mail, facsimile transmission, modem communication and the like. The address book function of the present system may be utilized to broadcast communications to a wide variety of recipients. Multiple linked databases have separate address books for different groups and different destinations may be created by the users. The address book function includes a textual search capability which allows fast and efficient location of specific addresses as described more fully below.

Hardware Components

Figure 2:
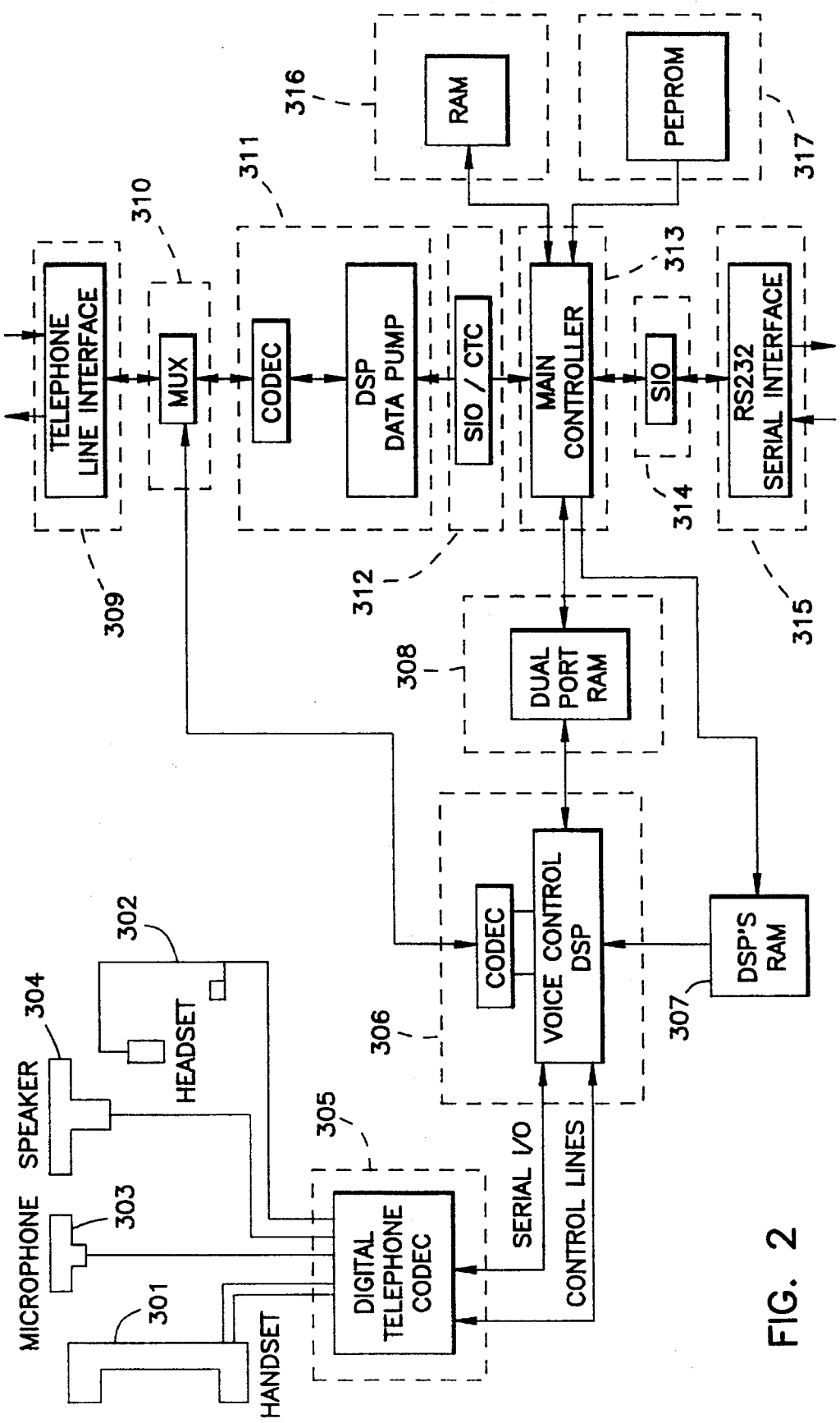
FIG. 2 is a block diagram of the hardware components of the present system.

FIG. 2 is a block diagram of the hardware components of the present system corresponding to reference number 20 of FIG. 1. These components form the link between the user, the personal computer running the software component of the present system and the telephone line interface. As will be more fully described below, the interface to the hardware components of the present system is via a serial communications port connected to the personal computer. The interface protocol is well ordered and defined such that other software systems or programs running on the personal computer may be designed and implemented which would be capable of controlling the hardware components shown in FIG. 2 by using the control and communications protocol defined below.

In the preferred embodiment of the present system, three alternate telephone interfaces are available: the telephone handset 301, a telephone headset 302, and a hands-free microphone 303 and speaker 304. Regardless of the telephone interface, the three alternative interfaces connect to the digital telephone coder-decoder (CODEC) circuit 305.

The digital telephone CODEC circuit 305 interfaces with the voice control digital signal processor (DSP) circuit 306 which includes a voice control DSP and CODEC. This circuit does digital to analog (D/A) conversion, analog to digital (A/D) conversion, coding/decoding, gain control and is the interface between the voice control DSP circuit 306 and the telephone interface. The CODEC of the voice control circuit 306 transfers digitized voice information in a compressed format to multiplexor circuit 310 to analog telephone line interface 309.

The CODEC of the voice control circuit 306 is actually an integral component of a voice control digital signal processor integrated circuit, as described more fully below. The voice control DSP of circuit 306 controls the digital telephone CODEC circuit 305, performs voice compression and echo cancellation.

Multiplexor (MUX) circuit 310 selects between the voice control DSP circuit 306 and the data pump DSP circuit 311 for transmission of information on the telephone line through telephone line interface circuit 309.

The data pump circuit 311 also includes a digital signal processor (DSP) and a CODEC for communicating over the telephone line interface 309 through MUX circuit 310. The data pump DSP and CODEC of circuit 311 performs functions such as modulation, demodulation and echo cancellation to communicate over the telephone line interface 309 using a plurality of telecommunications standards including FAX and modem protocols.

The main controller circuit 313 controls the DSP data pump circuit 311 and the voice control DSP circuit 306 through serial input/output and clock timer control (SIO/CTC) circuits 312 and dual port RAM circuit 308 respectively. The main controller circuit 313 communicates with the voice control DSP 306 through dual port RAM circuit 308. In this fashion digital voice data can be read and written simultaneously to the memory portions of circuit 308 for high speed communication between the user (through interfaces 301, 302 or 303/304) and the personal computer connected to serial interface circuit 315 and the remote telephone connection connected through the telephone line attached to line interface circuit 309.

As described more fully below, the main controller circuit 313 includes, in the preferred embodiment, a microprocessor which controls the functions and operation of all of the hardware components shown in FIG. 2. The main controller is connected to RAM circuit 316 and an programmable and electrically erasable read only memory (EEPROM) circuit 317. The EEPROM circuit 317 includes non-volatile memory in which the executable control programs for the voice control DSP circuits 306 and the main controller circuits 313 operate.

The RS232 serial interface circuit 315 communicates to the serial port of the personal computer which is running the software components of the present system. The RS232 serial interface circuit 315 is connected to a serial input/output circuit 314 with main controller circuit 313. SIO circuit 314 is in the preferred embodiment, a part of SIO/CTC circuit 312.

Functional Operation of the Hardware Components

Referring once again to FIG. 2, the multiple and selectable functions described in conjunction with FIG. 2 are all implemented in the hardware components of FIG. 2. Each of these functions will be discussed in turn.

The telephone function 115 is implemented by the user either selecting a telephone number to be dialed from the address book 127 or manually selecting the number through the telephone menu on the personal computer. The telephone number to be dialed is downloaded from the personal computer over the serial interface and received by main controller 313. Main controller 313 causes the data pump DSP circuit 311 to seize the telephone line and transmit the DTMF tones to dial a number. DSP 306 receives commands from the personal computer via main controller 313 to configure the digital telephone CODEC circuit 305 to enable either the handset 301 operation, the microphone 303 and speaker 304 operation or the headset 302 operation. A telephone connection is established through the telephone line interface circuit 309 and communication is enabled. The user's analog voice is transmitted in an analog fashion to the digital telephone CODEC 305 where it is digitized. The digitized voice patterns are passed to the voice control circuit 306 where echo cancellation is accomplished, the digital voice signals are reconstructed into analog signals and passed through multiplexor circuit 310 to the telephone line interface circuit 309 for analog transmission over the telephone line. The incoming analog voice from the telephone connection through telephone connection circuit 309 is passed to the integral CODEC of the voice control circuit 306 where it is digitized. The digitized incoming voice is then passed to digital telephone CODEC circuit 305 where it is reconverted to an analog signal for transmission to the selected telephone interface (either the handset 301, the microphone/speaker 303/304 or the headset 302). Voice Control DSP circuit 306 is programmed to perform echo cancellation to avoid feedback and echoes between transmitted and received signals, as is more fully described below.

In the voice mail function mode of the present system, voice messages may be stored for later transmission or the present system may operate as an answering machine receiving incoming messages. For storing digitized voice, the telephone interface is used to send the analog speech patterns to the digital telephone CODEC circuit 305. Circuit 305 digitizes the voice patterns and passes them to voice control circuit 306 where the digitized voice patterns are digitally compressed. The digitized and compressed voice patterns are passed through dual port ram circuit 308 to the main controller circuit 313 where they are transferred through the serial interface to the personal computer using a packet protocol defined below. The voice patterns are then stored on the disk of the personal computer for later use in multi-media mail, for voice mail, as a pre-recorded answering machine message or for later predetermined transmission to other sites.

For the present system to operate as an answering machine, the hardware components of FIG. 2 are placed in answer mode. An incoming telephone ring is detected through the telephone line interface circuit 309 and the main controller circuit 313 is alerted which passes the information off to the personal computer through the RS232 serial interface circuit 315. The telephone line interface circuit 309 seizes the telephone line to make the telephone connection. A pre-recorded message may be sent by the personal computer as compressed and digitized speech through the RS232 interface to the main controller circuit 313. The compressed and digitized speech from the personal computer is passed from main controller circuit 313 through dual port ram circuit 308 to the voice control DSP circuit 306 where it is uncompressed and converted to analog voice patterns. These analog voice patterns are passed through multiplexor circuit 310 to the telephone line interface 309 for transmission to the caller. Such a message may invite the caller to leave a voice message at the sound of a tone. The incoming voice messages are received through telephone line interface 309 and passed to voice control circuit 306. The analog voice patterns are digitized by the integral CODEC of voice control circuit 306 and the digitized voice patterns are compressed by the voice control DSP of the voice control circuit 306. The digitized and compressed speech patterns are passed through dual port ram circuit 308 to the main controller circuit 313 where they are transferred using packet protocol described below through the RS232 serial interface 315 to the personal computer for storage and later retrieval. In this fashion the hardware components of FIG. 2 operate as a transmit and receive voice mail system for implementing the voice mail function 117 of the present system.

The hardware components of FIG. 2 may also operate to facilitate the fax manager function 119 of FIG. 2. In fax receive mode, an incoming telephone call will be detected by a ring detect circuit of the telephone line interface 309 which will alert the main controller circuit 313 to the incoming call. Main controller circuit 313 will cause line interface circuit 309 to seize the telephone line to receive the call. Main controller circuit 313 will also concurrently alert the operating programs on the personal computer through the RS232 interface using the packet protocol described below. Once the telephone line interface seizes the telephone line, a fax carrier tone is transmitted and a return tone and handshake is received from the telephone line and detected by the data pump circuit 311. The reciprocal transmit and receipt of the fax tones indicates the imminent receipt of a facsimile transmission and the main controller circuit 313 configures the hardware components of FIG. 2 for the receipt of that information. The necessary handshaking with the remote facsimile machine is accomplished through the data pump 311 under control of the main controller circuit 313. The incoming data packets of digital facsimile data are received over the telephone line interface and passed through data pump circuit 311 to main controller circuit 313 which forwards the information on a packet basis (using the packet protocol described more fully below) through the serial interface circuit 315 to the personal computer for storage on disk. Those skilled in the art will readily recognize that the FAX data could be transferred from the telephone line to the personal computer using the same path as the packet transfer except using the normal AT stream mode. Thus the incoming facsimile is automatically received and stored on the personal computer through the hardware components of FIG. 2.

A facsimile transmission is also facilitated by the hardware components of FIG. 2. The transmission of a facsimile may be immediate or queued for later transmission at a predetermined or preselected time. Control packet information to configure the hardware components to send a facsimile are sent over the RS232 serial interface between the personal computer and the hardware components of FIG. 2 and are received by main controller circuit 313. The data pump circuit 311 then dials the recipient's telephone number using DTMF tones or pulse dialing over the telephone line interface circuit 309. Once an appropriate connection is established with the remote facsimile machine, standard facsimile handshaking is accomplished by the data pump circuit 311. Once the facsimile connection is established, the digital facsimile picture information is received through the data packet protocol transfer over serial line interface circuit 315, passed through main controller circuit 313 and data pump circuit 311 onto the telephone line through telephone line interface circuit 309 for receipt by the remote facsimile machine.

The operation of the multi-media mail function 121 of FIG. 2 is also facilitated by the hardware components of FIG. 2. A multimedia transmission consists of a combination of picture information, digital data and digitized voice information. For example, the type of multimedia information transferred to a remote site using the hardware components of FIG. 2 could be the multimedia format of the MicroSoft® Multimedia Wave® format with the aid of an Intelligent Serial Interface (ISI) card added to the personal computer. The multimedia may also be the type of multimedia information assembled by the software component of the present system which is described more fully below.

The multimedia package of information including text, graphics and voice messages (collectively called the multimedia document) may be transmitted or received through the hardware components shown in FIG. 2. For example, the transmission of a multimedia document through the hardware components of FIG. 2 is accomplished by transferring the multimedia digital information using the packet protocol described below over the RS232 serial interface between the personal computer and the serial line interface circuit 315. The packets are then transferred through main controller circuit 313 through the data pump circuit 311 on to the telephone line for receipt at a remote site through telephone line interface circuit 309. In a similar fashion, the multimedia documents received over the telephone line from the remote site are received at the telephone line interface circuit 309, passed through the data pump circuit 311 for receipt and forwarding by the main controller circuit 313 over the serial line interface circuit 315.

The show and tell function 123 of the present system allows the user to establish a data over voice communication session. In this mode of operation, full duplex data transmission may be accomplished simultaneously with the voice communication between both sites. This mode of operation assumes a like-configured remote site. The hardware components of the present system also include a means for sending voice/data over cellular links. The protocol used for transmitting multiplexed voice and data include a supervisory packet described more fully below to keep the link established through the cellular link. This supervisory packet is an acknowledgement that the link is still up. The supervisory packet may also contain link information to be used for adjusting various link parameters when needed. This supervisory packet is sent every second when data is not being sent and if the packet is not acknowledged after a specified number of attempts, the protocol would then give an indication that the cellular link is down and then allow the modem to take action. The action could be for example; change speeds, retrain, or hang up. The use of supervisory packets is a novel method of maintaining inherently intermittent cellular links when transmitting multiplexed voice and data.

The voice portion of the voice over data transmission of the show and tell function is accomplished by receiving the user's voice through the telephone interface 301, 302 or 303 and the voice information is digitized by the digital telephone circuit 305. The digitized voice information is passed to the voice control circuit 306 where the digitized voice information is compressed using a voice compression algorithm described more fully below. The digitized and compressed voice information is passed through dual port RAM circuit 308 to the main controller circuit 313. During quiet periods of the speech, a quiet flag is passed from voice control circuit 306 to the main controller 313 through a packet transfer protocol described below by a dual port RAM circuit 308.

Simultaneous with the digitizing compression and packetizing of the voice information is the receipt of the packetized digital information from the personal computer over interface line circuit 315 by main controller circuit 313. Main controller circuit 313 in the show and tell function of the present system must efficiently and effectively combine the digitized voice information with the digital information for transmission over the telephone line via telephone line interface circuit 309. As described above and as described more fully below, main controller circuit 313 dynamically changes the amount of voice information and digital information transmitted at any given period of time depending upon the quiet times during the voice transmissions. For example, during a quiet moment where there is no speech information being transmitted, main controller circuit 313 ensures that a higher volume of digital data information be transmitted over the telephone line interface in lieu of digitized voice information.

Also, as described more fully below, the packets of digital data transmitted over the telephone line interface with the transmission packet protocol described below, requires 100 percent accuracy in the transmission of the digital data, but a lesser standard of accuracy for the transmission and receipt of the digitized voice information. Since digital information must be transmitted with 100 percent accuracy, a corrupted packet of digital information received at the remote site must be re-transmitted. A retransmission signal is communicated back to the local site and the packet of digital information which was corrupted during transmission is retransmitted. If the packet transmitted contained voice data, however, the remote site uses the packets whether they were corrupted or not as long as the packet header was intact. If the header is corrupted, the packet is discarded. Thus, the voice information may be corrupted without requesting retransmission since it is understood that the voice information must be transmitted on a real time basis and the corruption of any digital information of the voice signal is not critical. In contrast to this the transmission of digital data is critical and retransmission of corrupted data packets is requested by the remote site.

The transmission of the digital data follows the CCITT V.42 standard, as is well known in the industry and as described in the CCITT Blue Book, volume VIII entitled Data Communication over the Telephone Network, 1989. The CCITT V.42 standard is hereby incorporated by reference. The voice data packet information also follows the CCITT V.42 standard, but uses a different header format so the receiving site recognizes the difference between a data packet and a voice packet. The voice packet is distinguished from a data packet by using undefined bits in the header (80 hex) of the V.42 standard. The packet protocol for voice over data transmission during the show and tell function of the present system is described more fully below.

Since the voice over data communication with the remote site is full-duplex, incoming data packets and incoming voice packets are received by the hardware components of FIG. 2. The incoming data packets and voice packets are received through the telephone line interface circuit 309 and passed to the main controller circuit 313 via data pump DSP circuit 311. The incoming data packets are passed by the main controller circuit 313 to the serial interface circuit 315 to be passed to the personal computer. The incoming voice packets are passed by the main controller circuit 313 to the dual port RAM circuit 308 for receipt by the voice control DSP circuit 306. The voice packets are decoded and the compressed digital information therein is uncompressed by the voice control DSP of circuit 306. The uncompressed digital voice information is passed to digital telephone CODEC circuit 305 where it is reconverted to an analog signal and retransmitted through the telephone line interface circuits. In this fashion full-duplex voice and data transmission and reception is accomplished through the hardware components of FIG. 2 during the show and tell functional operation of the present system.

Terminal operation 125 of the present system is also supported by the hardware components of FIG. 2. Terminal operation means that the local personal computer simply operates as a "dumb" terminal including file transfer capabilities. Thus no local processing takes place other than the handshaking protocol required for the operation of a dumb terminal. In terminal mode operation, the remote site is assumed to be a modem connected to a personal computer but the remote site is not necessarily a site which is configured according to the present system. In terminal mode of operation, the command and data information from personal computer is transferred over the RS232 serial interface circuit 315, forwarded by main controller circuit 313 to the data pump circuit 311 where the data is placed on the telephone line via telephone line interface circuit 309.

In a reciprocal fashion, data is received from the telephone line over telephone line interface circuit 309 and simply forwarded by the data pump circuit 311, the main controller circuit 313 over the serial line interface circuit 315 to the personal computer.

As described above, and more fully below, the address book function of the present system is primarily a support function for providing telephone numbers and addresses for the other various functions of the present system.

Packet Protocol Between the PC and the Hardware Component

A special packet protocol is used for communication between the hardware components 20 and the personal computer (PC) 10. The protocol is used for transferring different types of information between the two devices such as the transfer of DATA, VOICE, and QUALIFIED information. The protocol also uses the BREAK as defined in CCITT X.28 as a means to maintain protocol synchronization. A description of this BREAK sequence is also described in the Statutory Invention Registration entitled "ESCAPE METHODS FOR MODEM COMMUNICATIONS", to Timothy D. Gunn filed Jan. 8, 1993, which is hereby incorporated by reference.

The protocol has two modes of operation. One mode is packet mode and the other is stream mode. The protocol allows mixing of different types of information into the data stream without having to physically switch modes of operation. The hardware component 20 will identify the packet received from the computer 10 and perform the appropriate action according to the specifications of the protocol. If it is a data packet, then the controller 313 of hardware component 20 would send it to the data pump circuit 311. If the packet is a voice packet, then the controller 313 of hardware component 20 would distribute that information to the Voice DSP 306. This packet transfer mechanism also works in the reverse, where the controller 313 of hardware component 20 would give different information to the computer 10 without having to switch into different modes. The packet protocol also allows commands to be sent to either the main controller 313 directly or to the Voice DSP 306 for controlling different options without having to enter a command state.

Packet mode is made up of 8 bit asynchronous data and is identified by a beginning synchronization character (01 hex) followed by an ID/LI character and then followed by the information to be sent. In addition to the ID/LI character codes defined below, those skilled in the art will readily recognize that other ID/LI character codes could be defined to allow for additional types of packets such as video data, or alternate voice compression algorithm packets such as Codebook Excited Linear Predictive Coding (CELP) algorithm, GSM, RPE, VSELP, etc.

Stream mode is used when large amounts of one type of packet (VOICE, DATA, or QUALIFIED) is being sent. The transmitter tells the receiver to enter stream mode by a unique command. Thereafter, the transmitter tells the receiver to terminate stream mode by using the BREAK command followed by an "AT" type command. The command used to terminate the stream mode can be a command to enter another type of stream mode or it can be a command to enter back into packet mode.

Currently there are 3 types of packets used: DATA, VOICE, and QUALIFIED. Table 1 shows the common packet parameters used for all three packet types. Table 2 shows the three basic types of packets with the sub-types listed.

TABLE 1

Packet Parameters

1. Asynchronous transfer
2. 8 bits, no parity
3. Maximum packet length of 128 bytes
   IDentifier byte   = 1
   InFormation       = 127
4. SPEED
   variable from 9600 to 57600
   default to 19200

TABLE 2

Packet Types

1. Data
2. Voice
3. Qualified:
   a. COMMAND
   b. RESPONSE
   c. STATUS
   d. FLOW CONTROL
   e. BREAK
   f. ACK
   g. NAK
   h. STREAM A Data Packet is shown in Table 1 and is used for normal data transfer between the controller 313 of hardware component 20 and the computer 10 for such things as text, file transfers, binary data and any other type of information presently being sent through modems. All packet transfers begin with a synch character 01 hex (synchronization byte). The Data Packet begins with an ID byte which specifies the packet type and packet length. Table 3 describes the Data Packet byte structure and Table 4 describes the bit structure of the ID byte of the Data Packet. Table 5 is an example of a Data Packet with a byte length of 6. The value of the LI field is the actual length of the data field to follow, not counting the ID byte.

TABLE 3

Data Packet Byte Structure byte 1      = 01h (sync byte)
byte 2      = ID/LI (ID byte/length indicator)
bytes 3–127 = data (depending on LI)

| 01 SYNC | ID LI | data | data | data | data | — — — | data |
|---------|-------|------|------|------|------|-------|------|

TABLE 4

ID Byte of Data Packet

Bit 7       identifies the type of packet
Bits 6–0    contain the LI or length indicator
            portion of the ID byte

| 7 | 6 | 5 | 4 | 3 | 2 | 1 | 0 |
|---|---|---|---|---|---|---|---|
| 0 | LI (Length Indicator) = 1 to 127 | | | | | | |

TABLE 5

Data Packet Example

LI (length indicator) = 6

| 01 SYNC | 06 ID | data | data | data | data | data | data |
|---------|-------|------|------|------|------|------|------|

The Voice Packet is used to transfer compressed VOICE messages between the controller 313 of hardware component 20 and the computer 10. The Voice Packet is similar to the Data Packet except for its length which is, in the preferred embodiment, currently fixed at 23 bytes of data. Once again, all packets begin with a synchronization character chosen in the preferred embodiment to be 01 hex (01 H). The ID byte of the Voice Packet is completely a zero byte: all bits are set to zero. Table 6 shows the ID byte of the Voice Packet and Table 7 shows the Voice Packet byte structure.

TABLE 6

ID Byte of Voice Packet

| 7 | 6 | 5 | 4 | 3 | 2 | 1 | 0 |
|---|---|---|---|---|---|---|---|
| 0 | LI (Length Indicator) = 0 | | | | | | |

TABLE 7

Voice Packet Byte Structure

LI (length indicator) = 0
23 bytes of data
(depending upon compression algorithm used)

| 01 SYNC | 00 ID | data | data | data | data | — — — | data |
|---------|-------|------|------|------|------|-------|------|

The Qualified Packet is used to transfer commands and other non-data/voice related information between the controller 313 of hardware component 20 and the computer 10. The various species or types of the Qualified Packets are described below and are listed above in Table 2. Once again, all packets start with a synchronization character chosen in the preferred embodiment to be 01 hex (01 H). A Qualified Packet starts with two bytes where the first byte is the ID byte and the second byte is the QUALIFIER type identifier. Table 8 shows the ID byte for the Qualified Packet, Table 9 shows the byte structure of the Qualified Packet and Tables 10–12 list the Qualifier Type byte bit maps for the three types of Qualified Packets.

TABLE 8

ID Byte of Qualified Packet

| 7 | 6 | 5 | 4 | 3 | 2 | 1 | 0 |
|---|---|---|---|---|---|---|---|
| 1 | | | LI (Length Indicator) = 1 to 127 | | | | |

The Length Identifier of the ID byte equals the amount of data which follows including the QUALIFIER byte (QUAL byte+DATA). If LI=1, then the Qualifier Packet contains the Q byte only.

TABLE 9

Qualifier Packet Byte Structure

| 01 SYNC | 85 ID | QUAL BYTE | data | data | data | — — — | data |
|---------|-------|-----------|------|------|------|-------|------|

The bit maps of the Qualifier Byte (QUAL BYTE) of the Qualified Packet are shown in Tables 10–12. The bit map follows the pattern whereby if the QUAL byte=0, then the command is a break. Also, bit 1 of the QUAL byte designates ack/nak, bit 2 designates flow control and bit 6 designates stream mode command. Table 10 describes the Qualifier Byte of Qualified Packet, Group 1 which are immediate commands. Table 11 describes the Qualifier Byte of Qualified Packet, Group 2 which are stream mode commands in that the command is to stay in the designated mode until a BREAK+INIT command string is sent. Table 12 describes the Qualifier Byte of Qualified Packet, Group 3 which are information or status commands.

TABLE 10

Qualifier Byte of Qualified Packet: Group 1

| 7 | 6 | 5 | 4 | 3 | 2 | 1 | 0 | |
|---|---|---|---|---|---|---|---|---|
| x | x | x | x | x | x | x | x | |
| 0 | 0 | 0 | 0 | 0 | 0 | 0 | 0 | = break |
| 0 | 0 | 0 | 0 | 0 | 0 | 1 | 0 | = ACK |
| 0 | 0 | 0 | 0 | 0 | 0 | 1 | 1 | = NAK |
| 0 | 0 | 0 | 0 | 0 | 1 | 0 | 0 | = xoff or stop sending data |
| 0 | 0 | 0 | 0 | 0 | 1 | 0 | 1 | = xon or resume sending data |
| 0 | 0 | 0 | 0 | 1 | 0 | 0 | 0 | = cancel fax |

TABLE 11

Qualifier Byte of Qualified Packet: Group 2

| 7 | 6 | 5 | 4 | 3 | 2 | 1 | 0 | |
|---|---|---|---|---|---|---|---|---|
| x | x | x | x | x | x | x | x | |
| 0 | 1 | 0 | 0 | 0 | 0 | 0 | 1 | = stream command mode |
| 0 | 1 | 0 | 0 | 0 | 0 | 1 | 0 | = stream data |
| 0 | 1 | 0 | 0 | 0 | 0 | 1 | 1 | = stream voice |
| 0 | 1 | 0 | 0 | 0 | 1 | 0 | 0 | = stream video |
| 0 | 1 | 0 | 0 | 0 | 1 | 0 | 1 | = stream A |
| 0 | 1 | 0 | 0 | 0 | 1 | 1 | 0 | = stream B |
| 0 | 1 | 0 | 0 | 0 | 1 | 1 | 1 | = stream C |

The Qualifier Packet indicating stream mode and BREAK attention is used when a large of amount of information is sent (voice, data . . . ) to allow the highest throughput possible. This command is mainly intended for use in DATA mode but can be used in any one of the possible modes. To change from one mode to another, a break-init sequence would be given. A break "AT . . . <cr>" type command would cause a change in state and set the serial rate from the "AT" command.

TABLE 12

Qualifier Byte of Qualified Packet: Group 3

| 7 | 6 | 5 | 4 | 3 | 2 | 1 | 0 | |
|---|---|---|---|---|---|---|---|---|
| x | x | x | x | x | x | x | x | |
| 1 | 0 | 0 | 0 | 0 | 0 | 0 | 0 | = commands |
| 1 | 0 | 0 | 0 | 0 | 0 | 0 | 1 | = responses |
| 1 | 0 | 0 | 0 | 0 | 0 | 1 | 0 | = status |

Cellular Supervisory Packet

In order to determine the status of the cellular link, a supervisory packet shown in Table 13 is used. Both sides of the cellular link will send the cellular supervisory packet every 3 seconds. Upon receiving the cellular supervisory packet, the receiving side will acknowledge it using the ACK field of the cellular supervisory packet. If the sender does not receive an acknowledgement within one second, it will repeat sending the cellular supervisory packet up to 12 times. After 12 attempts of sending the cellular supervisory packet without an acknowledgement, the sender will disconnect the line. Upon receiving an acknowledgement, the sender will restart its 3 second timer. Those skilled in the art will readily recognize that the timer values and wait times selected here may be varied without departing from the spirit or scope of the present invention.

TABLE 13

Cellular Supervisory Packet Byte Structure

| 8F | ID | LI | ACK | data | data | — | — | — | data |
|----|----|----|-----|------|------|---|---|---|------|

Speech Compression

The Speech Compression algorithm described above for use in transmitting voice over data accomplished via the voice control circuit 306. Referring once again to FIG. 2, the user is talking either through the handset, the headset or the microphone/speaker telephone interface. The analog voice signals are received and digitized by the telephone CODEC circuit 305. The digitized voice information is passed from the digital telephone CODEC circuit 305 to the voice control circuits 306. The digital signal processor (DSP) of the voice control circuit 306 is programmed to do the voice compression algorithm. The source code programmed into the voice control DSP is in the microfiche appendix of U.S. patent application Ser. No. 08/002,467, filed Jan. 8, 1993 entitled "COMPUTER-BASED MULTIFUNCTION PERSONAL COMMUNICATIONS SYSTEM", which was previously incorporated by reference. The DSP of the voice control circuit 306 compresses the speech and places the compressed digital representations of the speech into special packets described more fully below. As a result of the voice compression algorithm, the compressed voice information is passed to the dual port ram circuit 308 for either forwarding and storage on the disk of the personal computer via the RS232 serial interface or for multiplexing with conventional modem data to be transmitted over the telephone line via the telephone line interface circuit 309 in the voice-over-data mode of operation Show and Tell function 123. The compressed speech bits are multiplexed with data bits using a packet format described below. Three compression rates are described herein which will be called 8 Kbit/sec, 9.6 Kbit/sec and 16 Kbit/sec.

Speech Compression Algorithm

To multiplex high-fidelity speech with digital data and transmit both over the telephone line, a high available bandwidth would normally be required. In the present invention, the analog voice information is digitized into 8-bit PCM data at an 8 KHz sampling rate producing a serial bit stream of 64,000 bps serial data rate. This rate cannot be transmitted over the telephone line. With the Speech Compression algorithm described below, the 64 Kbs digital voice data is compressed into a 9500 bps encoding bit stream using a fixed-point (non-floating point) DSP such that the compressed speech can be transmitted over the telephone line multiplexed with asynchronous data. This is accomplished in an efficient manner such that enough machine cycles remain during real time speech compression to allow to allow for echo cancellation in the same fixed-point DSP.

A silence detection function is used to detect quiet intervals in the speech signal which allows the data processor to substitute asynchronous data in lieu of voice data packets over the telephone line to efficiently time multiplex the voice and asynchronous data transmission. The allocation of time for asynchronous data transmission is constantly changing depending on how much silence is on the voice channel.

The voice compression algorithm of the present system relies on a model of human speech which shows that human speech contains redundancy inherent in the voice patterns. Only the incremental innovations (changes) need to be transmitted. The algorithm operates on 128 digitized speech samples (20 milliseconds at 6400 Hz), divides the speech samples into time segments of 32 samples (5 milliseconds) each, and uses predicted coding on each segment. Thus, the input to the algorithm could be either PCM data sampled at 6400 Hz or 8000 Hz. If the sampling is at 8000 Hz, or any other selected sampling rate, the input sample data stream must be decimated from 8000 Hz to 6400 Hz before processing the speech data. At the output, the 6400 Hz PCM signal is interpolated back to 8000 Hz and passed to the CODEC.

With this algorithm, the current segment is predicted as best as possible based on the past recreated segments and a difference signal is determined. The difference values are compared to the stored difference values in a lookup table or code book, and the address of the closest value is sent to the remote site along with the predicted gain and pitch values for each segment. In this fashion, the entire 20 milliseconds of speech can be represented by 190 bits, thus achieving an effective data rate of 9500 bps.

To produce this compression, the present system includes a unique Vector Quantization (VQ) speech compression algorithm designed to provide maximum fidelity with minimum compute power and bandwidth. The VQ algorithm has two major components. The first section reduces the dynamic range of the input speech signal by removing short term and long term redundancies. This reduction is done in the waveform domain, with the synthesized part used as the reference for determining the incremental "new" content. The second section maps the residual signal into a code book optimized for preserving the general spectral shape of the speech signal.

Figure 3:
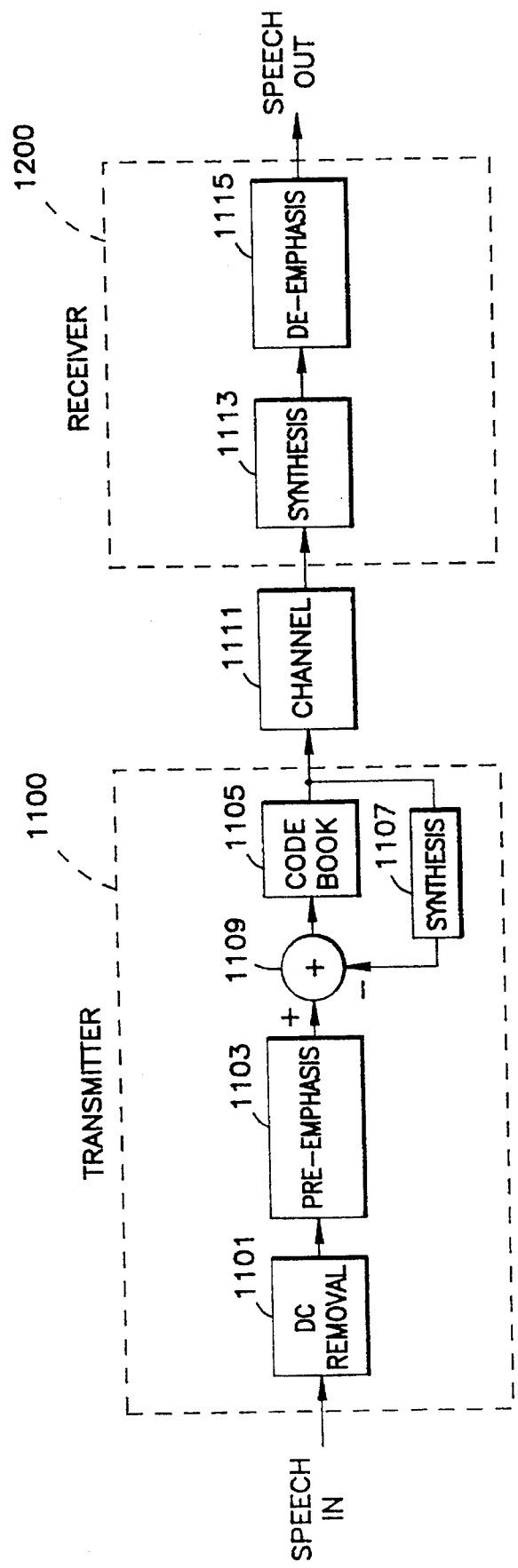
FIG. 3 is a detailed function flow diagram of the speech compression algorithm.

FIG. 3 is a high level signal flow block diagram of the speech compression algorithm used in the present system to compress the digitized voice for transmission over the telephone line in the voice over data mode of operation or for storage and use on the personal computer. The transmitter and receiver components are implemented using the programmable voice control DSP/CODEC circuit 306 shown in FIG. 2.

The DC removal stage 1101 receives the digitized speech signal and removes the D.C. bias by calculating the long-term average and subtracting it from each sample. This ensures that the digital samples of the speech are centered about a zero mean value. The pre-emphasis stage 1103 whitens the spectral content of the speech signal by balancing the extra energy in the low band with the reduced energy in the high band.

The system finds the innovation in the current speech segment by subtracting 1109 the prediction from reconstructed past samples synthesized from synthesis stage 1107. This process requires the synthesis of the past speech samples locally (analysis by synthesis). The synthesis block 1107 at the transmitter performs the same function as the synthesis block 1113 at the receiver. When the reconstructed previous segment of speech is subtracted from the present segment (before prediction), a difference term is produced in the form of an error signal. This residual error is used to find the best match in the code book 1105. The code book 1105 quantizes the error signal using a code book generated from a representative set of speakers and environments. A minimum mean squared error match is determined in segments.

In addition, the code book is designed to provide a quantization error with spectral rolloff (higher quantization error for low frequencies and lower quantization error for higher frequencies). Thus, the quantization noise spectrum in the reconstructed signal will always tend to be smaller than the underlying speech signal.

The following description will specifically explain the algorithm for the 9.6 Kbit/sec compression rate, except where specifically stated otherwise. The discussion is applicable to the other compression rates by substituting the parameter values found in Table 14, below, and by following the special instructions for each calculation provided throughout the discussion.

TABLE 14

Speech Compression Algorithm Parameters For Three Voice Compression Rates

| Parameter | 16Kbit/sec | 9.6Kbit/sec | 8Kbit/sec |
|---|---|---|---|
| Input Samples (msecs @ 8Ksample/sec) | 160 (20 msec) | 160 (20 msec) | 192 (24 msec) |
| Decimaled Samples (msec) @ rate | 160 (20 msec) @ 8Ksample/sec | 128 (20 msec) @ 6.4Ksample/sec | 144 (24 msec) 6Ksample/sec |
| Sub-Block Size | 40 | 32 | 36 |
| Min_Pitch | 40 | 32 | 36 |
| Max_Pitch | 160 | 95 | 99 |
| Codebook Size | 256 | 512 | 512 |
| Vector Size (VSIZE) | 5 | 8 | 9 |
| # of compressed bytes | 40 | 24 | 24 |
| ρ | 0.75 | 0.5 | 0.5 |

9.6 Kbit/sec Compression Rate Algorithm

For the 9.6 Kbit/sec speech compression rate, each frame of 20 ms is divided into 4 sub-blocks or segments of 5 ms each. Each sub-block of data consists of a plurality of bits for the long term predictor, a plurality of bits for the long term predictor gain, a plurality of bits for the sub-block gain, and a plurality of bits for each code book entry for each 5 ms. In the code book block, each 1.25 ms of speech is looked up in a 512 word code book for the best match. The table entry is transmitted rather than the actual samples. The code book entries are pre-computed from representative speech segments, as described more fully below.

On the receiving end 1200, the synthesis block 1113 at the receiver performs the same function as the synthesis block 1107 at the transmitter. The synthesis block 1113 reconstructs the original signal from the voice data packets by using the gain and pitch values and code book address corresponding to the error signal most closely matched in the code book. The code book at the receiver is similar to the code book 1105 in the transmitter. Thus the synthesis block recreates the original pre-emphasized signal. The de-emphasis stage 1115 inverts the pre-emphasis operation by restoring the balance of original speech signal.

The complete speech compression algorithm is summarized as follows:

a) Digitally sample the voice to produce a PCM sample bit stream sampled at 8,000 samples per second.

b) Decimate the 8,000 samples per second sampled data to produce a sampling rate of 6,400 samples per second for the 9.6 Kbit/sec compression rate (6,000 samples per second for the 8 Kbit/sec algorithm and 8,000 samples per second for the 16 Kbit/sec algorithm).

c) Remove any D.C. bias in the speech signal.

d) Pre-emphasize the signal.

e) Find the innovation in the current speech segment by subtracting the prediction from reconstructed past samples. This step requires the synthesis of the past speech samples locally (analysis by synthesis) such that the residual error is fed back into the system.

f) Quantize the error signal using a code book generated from a representative set of speakers and environments. A minimum mean squared error match is determined in 5 ms segments. In addition, the code book is designed to provide a quantization error with spectral rolloff (higher quantization error for low frequencies and lower quantization error for higher frequencies). Thus, the quantization noise spectrum in the reconstructed signal will always tend to be smaller than the underlying speech signal.

g) At the transmitter and the receiver, reconstruct the speech from the quantized error signal fed into the inverse of the function in step (e) above. Use this signal for analysis by synthesis and for the output to the reconstruction stage below.

h) Use a de-emphasis filter to reconstruct the output.

The major advantages of this approach over other low-bit-rate algorithms are that there is no need for any complicated calculation of reflection coefficients (no matrix inverse or lattice filter computations). Also, the quantization noise in the output speech is hidden under the speech signal and there are no pitch tracking artifacts: the speech sounds "natural", with only minor increases of background hiss at lower bit-rates. The computational load is reduced significantly compared to a VSELP algorithm and variations of the present algorithm thus provides bit rates of 8, 9.6 and 16 Kbit/sec, and can also provide bit rates of 9.2 Kbit/sec, 9.5 Kbit/sec and many other rates. The total delay through the analysis section is less than 20 milliseconds in the 9.6 Kbit/sec embodiment. The present algorithm is accomplished completely in the waveform domain and there is no spectral information being computed and there is no filter computations needed.

Detailed Description of the Speech Compression Algorithm

The speech compression algorithm is described in greater detail with reference to FIGS. 4 through 7, and with reference to the block diagram of the hardware components of the present system shown at FIG. 2. The voice compression algorithm operates within the programmed control of the voice control DSP circuit 306. In operation, the speech or analog voice signal is received through the telephone interface 301, 302 or 303 and is digitized by the digital telephone CODEC circuit 305. The CODEC for circuit 305 is a companding μ-law CODEC. The analog voice signal from the telephone interface is band-limited to about 3,000 Hz and sampled at a selected sampling rate by digital telephone CODEC 305. The sample rates in the 9.6 Kbit/sec embodiment of the present invention are 8 Ksample/sec. Each sample is encoded into 8-bit PCM data producing a serial 64 kb/s. The digitized samples are passed to the voice control DSP/CODEC of circuit 306. There, the 8-bit μ-law PCM data is converted to 13-bit linear PCM data. The 13-bit representation is necessary to accurately represent the linear version of the logarithmic 8-bit μ-law PCM data. With linear PCM data, simpler mathematics may be performed on the PCM data.

The voice control DSP/CODEC of circuit 306 correspond to the single integrated circuit U8 shown in FIGS. 9A and 9B as a WE® DSP16C Digital Signal Processor/CODEC from AT&T Microelectronics which is a combined digital signal processor and a linear CODEC in a single chip as described above. The digital telephone CODEC of circuit 305 corresponds to integrated circuit U12 shown in FIG. 9B as a T7540 companding μ-law CODEC.

The sampled and digitized PCM voice signals from the telephone μ-law CODEC 305 shown in FIG. 2 are passed to the voice control DSP/CODEC circuit 308 via direct data lines clocked and synchronized to a clocking frequency. The sample rate in CODEC 305 in this embodiment of the present invention is 8 Ksample/sec. The digital samples are loaded into the voice control DSP/CODEC one at a time through the serial input and stored into an internal queue held in RAM, converted to linear PCM data and decimated to a sample rate of 6.4 Ksample/sec. As the samples are loaded into the end of the queue in the RAM of the voice control DSP, the samples at the head of the queue are operated upon by the voice compression algorithm. The voice compression algorithm then produces a greatly compressed representation of the speech signals in a digital packet form. The compressed speech signal packets are then passed to the dual port RAM circuit 308 shown in FIG. 2 for use by the main controller circuit 313 for either transferring in the voice-over-data mode of operation or for transfer to the personal computer for storage as compressed voice for functions such as telephone answering machine message data, for use in the multi-media documents and the like.

In the voice-over-data mode of operation, voice control DSP/CODEC circuit 306 of FIG. 2 will be receiving digital voice PCM data from the digital telephone CODEC circuit 305, compressing it and transferring it to dual port RAM circuit 308 for multiplexing and transfer over the telephone line. This is the transmit mode of operation of the voice control DSP/CODEC circuit 306 corresponding to transmitter block 1100 of FIG. 3 and corresponding to the compression algorithm of FIG. 4.

Concurrent with this transmit operation, the voice control DSP/CODEC circuit 306 is receiving compressed voice data packets from dual port RAM circuit 308, uncompressing the voice data and transferring the uncompressed and reconstructed digital PCM voice data to the digital telephone CODEC 305 for digital to analog conversion and eventual transfer to the user through the telephone interface 301, 302, 304. This is the receive mode of operation of the voice control DSP/CODEC circuit 306 corresponding to receiver block 1200 of FIG. 3 and corresponding to the decompression algorithm of FIG. 5. Thus, the voice-control DSP/CODEC circuit 306 is processing the voice data in both directions in a full-duplex fashion.

The voice control DSP/CODEC circuit 306 operates at a clock frequency of approximately 24.576 MHz while processing data at sampling rates of approximately 8 KHz in both directions. The voice compression/decompression algorithms and packetization of the voice data is accomplished in a quick and efficient fashion to ensure that all processing is done in real-time without loss of voice information. This is accomplished in an efficient manner such that enough machine cycles remain in the voice control DSP circuit 306 during real time speech compression to allow real time acoustic and line echo cancellation in the same fixed-point DSP.

In programmed operation, the availability of an eight-bit sample of PCM voice data from the μ-law digital telephone CODEC circuit 305 causes an interrupt in the voice control DSP/CODEC circuit 306 where the sample is loaded into internal registers for processing. Once loaded into an internal register it is transferred to a RAM address which holds a queue of samples. The queued PCM digital voice samples are converted from 8-bit μ-law data to a 13-bit linear data format using table lookup for the conversion. Those skilled in the art will readily recognize that the digital telephone CODEC circuit 305 could also be a linear CODEC.

Sample Rate Decimation

The sampled and digitized PCM voice signals from the telephone μ-law CODEC 305 shown in FIG. 2 are passed to the voice control DSP/CODEC circuit 308 via direct data lines clocked and synchronized to a clocking frequency. The sample rate in this embodiment of the present invention is 8 Ksample/sec. The digital samples for the 9.6 Kbit/sec and 8 Kbit/sec algorithms are decimated using a digital decimation process to produce a 6.4 Ksample/sec and 6 Ksample/sec rate, respectively. For the 16 Kbit/sec algorithm, no decimation is needed.

Referring to FIG. 3, the decimated digital samples are shown as speech entering the transmitter block 1100. The transmitter block, of course, is the mode of operation of the voice-control DSP/CODEC circuit 306 operating to receive local digitized voice information, compress it and packetize it for transfer to the main controller circuit 313 for transmission on the telephone line. The telephone line connected to telephone line interface 309 of FIG. 2 corresponds to the channel 1111 of FIG. 3.

A frame rate for the voice compression algorithm is 20 milliseconds of speech for each compression. This correlates to 128 samples to process per frame for the 6.4K decimated sampling rate. When 128 samples are accumulated in the queue of the internal DSP RAM, the compression of that sample frame is begun.

Data Flow Description

The voice-control DSP/CODEC circuit 306 is programmed to first remove the DC component 1101 of the incoming speech. The DC removal is an adaptive function to establish a center base line on the voice signal by digitally adjusting the values of the PCM data. This corresponds to the DC removal stage 1203 of the software flow chart of FIG. 4. The formula for removal of the DC bias or drift is as follows:

$$x(n) = s(n) - s(n-1) + \alpha * x(n-1) \text{ where } \alpha = \frac{32735}{32768}$$

and where
n=sample number,
s(n) is the current sample, and
x(n) is the sample with the DC bias removed.

The removal of the DC is for the 20 millisecond frame of voice which amounts to 128 samples at the 6.4 Ksample/sec decimated sampling rate which corresponds to the 9.6 Kbit/sec algorithm. The selection of α is based on empirical observation to provide the best result.

Figure 4:
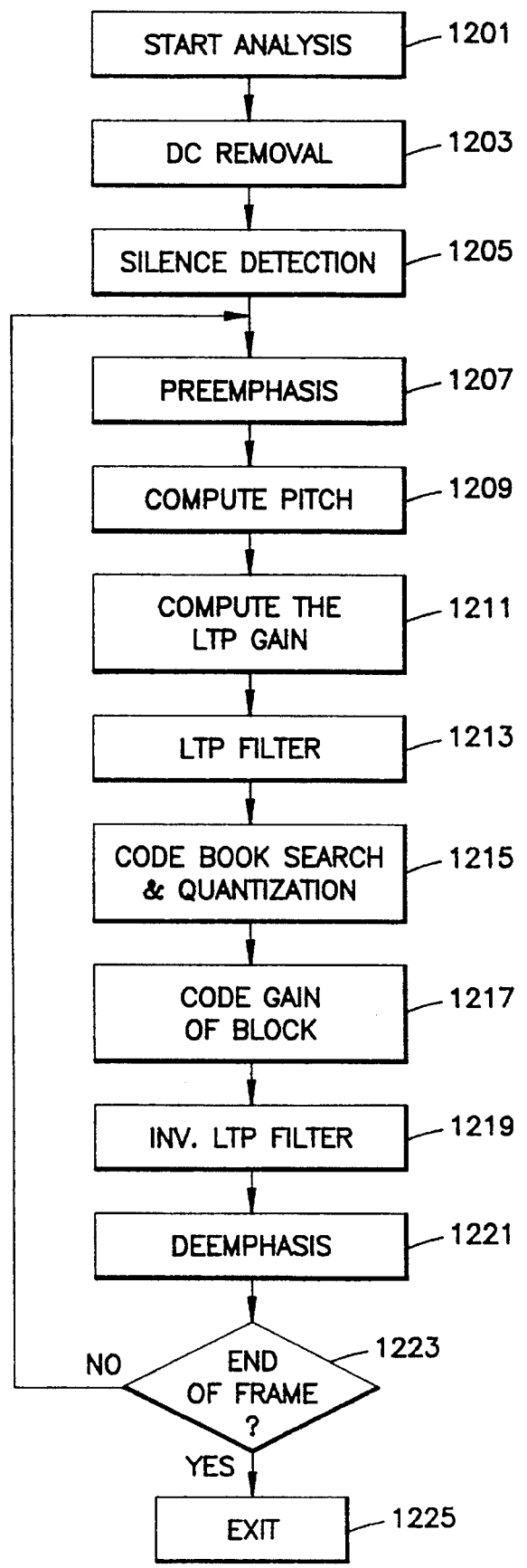
FIG. 4 is a detailed function flow diagram of the speech decompression algorithm.
Figure 6:
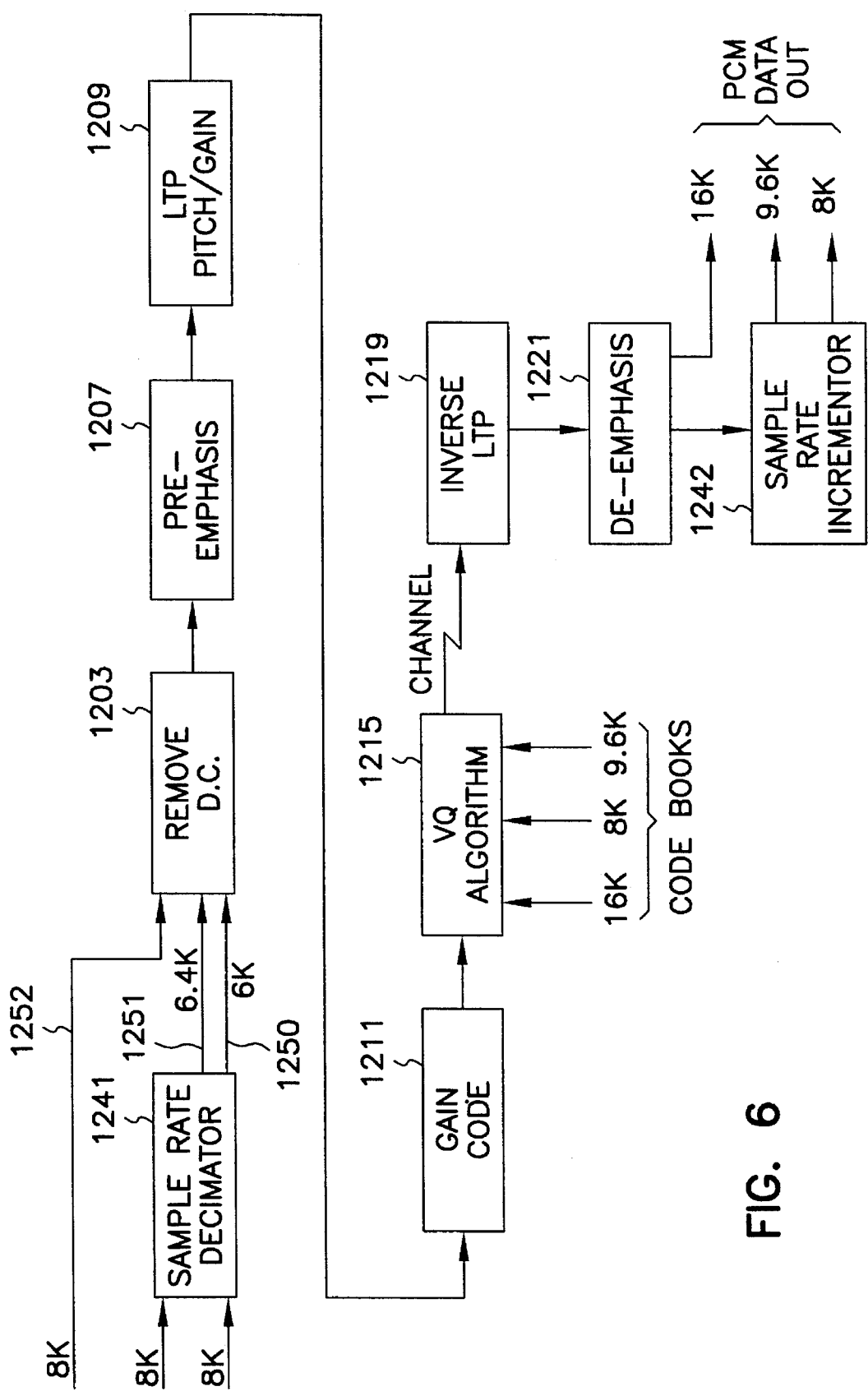
FIG. 6 is a signal flow diagram of the speech compression algorithm showing details of the code book synthesis.
Figure 7:
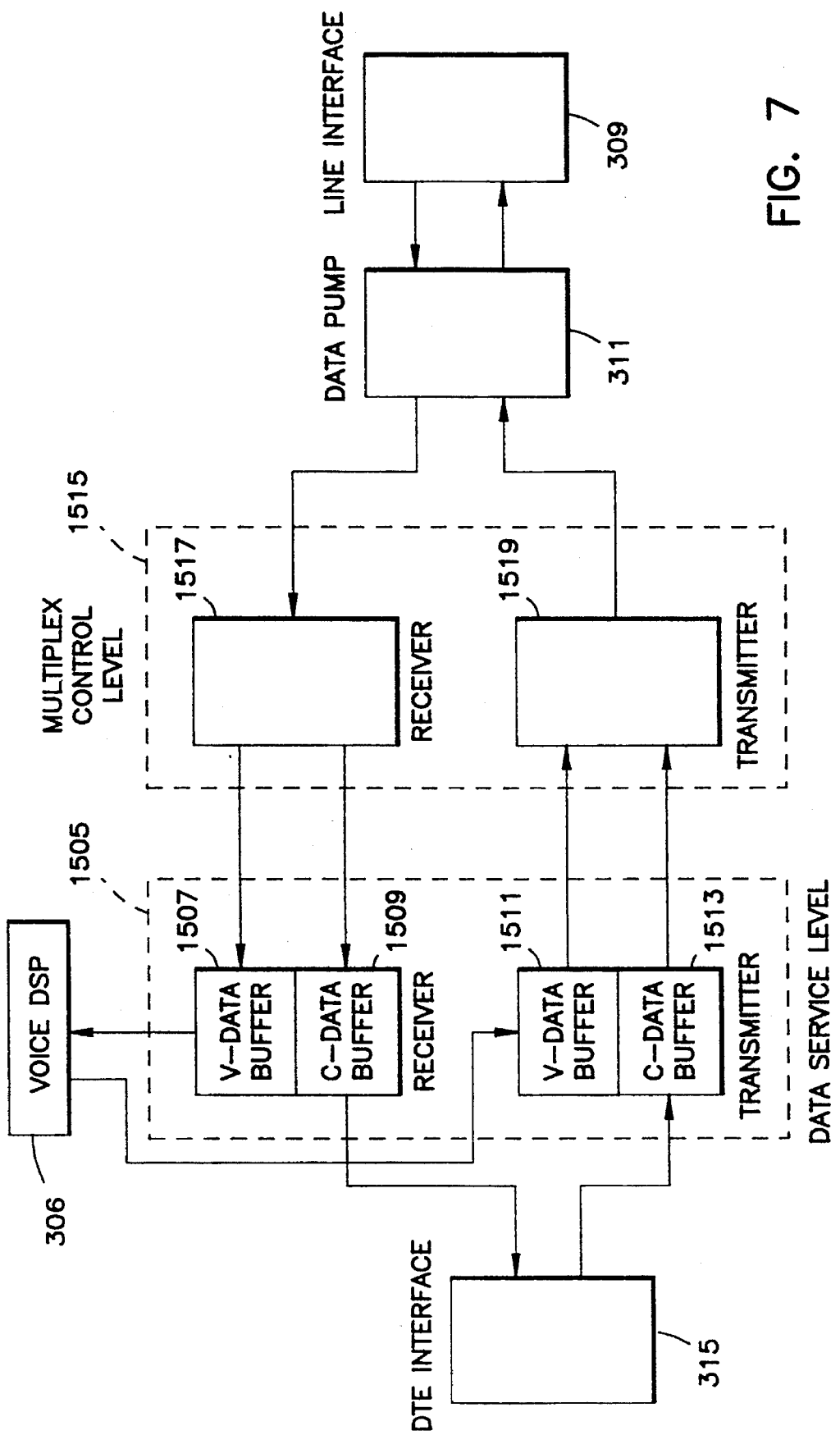
FIG. 7 is a detailed function flow diagram of the voice/data multiplexing function.

Referring again to FIG. 4, the voice compression algorithm in a control flow diagram is shown which will assist in the understanding of the block diagram of FIG. 3. FIG. 6 is a simplified data flow description of the flow chart of FIG. 4 showing the sample rate decimator 1241 and the sample rate incrementor 1242. Sample rate decimator 1241 produces an output 1251 of 6.4 Ksample/sec for an 8 Ksample/ sec input in the 9.6 Kbit/sec system. (Similarly, a 6 Ksample/sec output 1250 is produced for the 8 Kbit/sec algorithm, and no decimation is performed on the 8 Ksample/sec voice sample rate 1252 for the 16 Kbit/sec algorithm.) The analysis and compression begin at block 1201 where the 13-bit linear PCM speech samples are accumulated until 128 samples (for the 6.4 Ksample/sec decimated sampling rate) representing 20 milliseconds of voice or one frame of voice is passed to the DC removal portion of code operating within the programmed voice control DSP/CODEC circuit 306. The DC removal portion of the code described above approximates the base line of the frame of voice by using an adaptive DC removal technique.

A silence detection algorithm 1205 is also included in the programmed code of the DSP/CODEC 306. The silence detection function is a summation of the square of each sample of the voice signal over the frame. If the power of the voice frame falls below a preselected threshold, this would indicate a silent frame. The detection of a silence frame of speech is important for later multiplexing of the V-data (voice data) and C-data (asynchronous computer data) described below. During silent portions of the speech, the main controller circuit 313 will transfer conventional digital data (C-data) over the telephone line in lieu of voice data (V-data). The formula for computing the power is $$PWR = \sum_{n=0}^{\text{Sub-Block Size}-1} x(n) * x(n)$$

where $n$ is the sample number, and $x(n)$ is the sample value

If the power PWR is lower than a preselected threshold, then the present voice frame is flagged as containing silence. The 128-sample (Decimated Samples) silent frame is still processed by the voice compression algorithm; however, the silent frame packets are discarded by the main controller circuit 313 so that asynchronous digital data may be transferred in lieu of voice data. The rest of the voice compression is operated upon in segments where there are four segments per frame amounting to 32 samples of data per segment (Sub-Block Size). It is only the DC removal and silence detection which is accomplished over an entire 20 millisecond frame.

The pre-emphasis 1207 of the voice compression algorithm shown in FIG. 4 is the next step. The sub-blocks are first passed through a pre-emphasis stage which whitens the spectral content of the speech signal by balancing the extra energy in the low band with the reduced energy in the high band. The pre-emphasis essentially flattens the signal by reducing the dynamic range of the signal. By using pre-emphasis to flatten the dynamic range of the signal, less of a signal range is required for compression making the compression algorithm operate more efficiently. The formula for the pre-emphasis is $x(n) = x(n) - \rho * x(n - 1)$
where $\rho = 0.5$ for 9.6Kbit/sec
and where $n$ is the sample number,
$x(n)$ is the sample Each segment thus amounts to five milliseconds of voice which is equal to 32 samples. Pre-emphasis then is done on each segment. The selection of $\rho$ is based on empirical observation to provide the best result.

The next step is the long-term prediction (LTP). The long-term prediction is a method to detect the innovation in the voice signal. Since the voice signal contains many redundant voice segments, we can detect these redundancies and only send information about the changes in the signal from one segment to the next. This is accomplished by comparing the speech samples of the current segment on a sample by sample basis to the reconstructed speech samples from the previous segments to obtain the innovation information and an indicator of the error in the prediction.

The long-term predictor gives the pitch and the LTP-Gain of the sub-block which are encoded in the transmitted bit stream. In order to predict the pitch in the current segment, we need at least 3 past sub-blocks of reconstructed speech. This gives a pitch value in the range of MIN_PITCH to MAX_PITCH (32 and 95, respectively, as given in Table 14). This value is coded with 6-bits. But, in order to accommodate the compressed data rate within a 9600 bps link, the pitch for segments 0 and 3 is encoded with 6 bits, while the pitch for segments 1 and 2 is encoded with 5 bits. When performing the prediction of the Pitch for segments 1 and 2, the correlation lag is adjusted around the predicted pitch value of the previous segment. This gives us a good chance of predicting the correct pitch for the current segment even though the entire range for prediction is not used. The computations for the long-term correlation lag PITCH and associated LTP-gain factor $\beta$ j (where j=0, 1, 2, 3 corresponding to each of the four segments of the frame) are done as follows:

For j=min_pitch . . . max_pitch, first perform the following computations between the current speech samples $x(n)$ and the past reconstructed speech samples $x'(n)$ $$S_{xx'}(j) = \sum_{i=0}^{\text{Sub-Block Size}-1} x(i) * x'(i + \text{MAX\_PITCH} - j)$$

$$S_{x'x'}(j) = \sum_{i=0}^{\text{Sub-Block Size}-1} x'(i + \text{MAX\_PITCH} - j) *$$

$$x'(i + \text{MAX\_PITCH} - j)$$

The Pitch j is chosen as that which maximizes $S_{xx'}^2/S_{x'x'}$. Since $\beta$ j is positive, only j with positive $S_{xx'}^2$ is considered.

For the 9.6 Kbit/sec and 8 Kbit/sec embodiments, the Pitch is encoded with different number of bits for each sub-segment, the value of min_pitch and max_pitch (range of the synthesized speech for pitch prediction of the current segment) is computed as follows:

```
if (seg_number = 0 or 3)
{
  min_pitch = MIN_PITCH
  max_pitch = MAX_PITCH
}
if (seg_number = 1 or 2)
{
  min_pitch = prev_pitch − 15
  if (prev_pitch < MIN_PITCH + 15)
    min_pitch = MIN_PITCH
  if (prev_pitch > MAX_PITCH + 15)
    min_pitch = MAX_PITCH − 30
  max_pitch = min_pitch + 30
}
```

(This calculation is not necessary for the 16 Kbit/sec algorithm.) The prev_pitch parameter in the above equation, is the of the pitch of the previous sub-segment. The pitch j is the encoded in 6 bits or 5 bits as:

encoded bits=j−min_pitch

The LTP-Gain is given by $$\beta = \frac{S_{xx'}(j)}{S_{x'x'}(j)} \text{ for } S_{x'x'}(j) \neq 0$$

The value of the $\beta$ is a normalized quantity between zero and unity for this segment where $\beta$ is an indicator of the correlation between the segments. For example, a perfect sine wave would produce a β which would be close to unity since the correlation between the current segments and the previous reconstructed segments should be almost a perfect match so β is one. The LTP gain factor is quantized from a LTP Gain Encode Table. This table is characterized in Table 15. The resulting index (bcode) is transmitted to the far end. At the receiver, the LTP Gain Factor is retrieved from Table 16, as follows:

The error signal e(n) is then normalized by $$e(n) = \frac{e(n)}{G_q}$$

TABLE 17

Gain Encode Table

G = 16  32  64  128  256  512  1024  2048  4096  8192
←—| |—| |—| |—| |—| |—| |—| |—| |—| |—→
  0    1   2   3    4    5    6     7     8     9
(gcode)

TABLE 18

Gain Decode Table

G = 16  32  64  128  256  512  1024  2048  4096  8192
|—| |—| |—| |—| |—| |—| |—| |—| |—| |—|
 0   1   2   3    4    5    6    7    8    9
(gcode)

$\beta_q = dlb\_tab[bcode]$

TABLE 15

LTP Gain Encode Table

β =    0.1    0.3    0.5    0.7    0.9
←—| |—| |—| |—| |—| |—→
bcode = 0   1    2     3      4      5

TABLE 16

LTP Gain Decode Table

β = 0.0   0.2    0.4    0.5    0.8    1.0
←—| |—| |—| |—| |—| |—→
bcode = 0   1     2      3      4      5

After the Long-Term Prediction, we pass the signal through a pitch filter to whiten the signal so that all the pitch effects are removed. The pitch filter is given by:

$$e(n) = x(n) - \beta_q * x'(n-j)$$

where j is the Lag, and $\beta_q$ is the associated Quantized LTP Gain.

Next, the error signal is normalized with respect to the maximum amplitude in the sub-segment for vector-quantization of the error signal. The maximum amplitude in the segment is obtained as follows:

$$G = MAX\{|e(n)|\}$$

The maximum amplitude (G) is encoded using the Gain Encode Table. This table is characterized in Table 17. The encoded amplitude (gcode) is transmitted to the far end. At the receiver, the maximum amplitude is retrieved from Table 18, as follows:

$$G_q = dlg\_tab[gcode]$$

From the Gain and LTP Gain Encode tables, we can see that we would require 4 bits for gcode and 3 bits for bcode. This results in total of 7 bits for both parameters. In order to reduce the bandwidth of the compressed bit stream, the gcode and bcode parameters are encoded together in 6 bits, as follows:

BGCODE=6*gcode+bcode.

The encoded bits for the G and LTP-Gain (β) at the receiver can be obtained as follows:

gcode=BGCODE/6 bcode=BGCODE−6*gcode

However, these calculations are needed only for the 8 Kbit/sec and 9.6 Kbit/sec algorithms.

Each segment of 32 samples (Sub-Block Size) is divided into 4 vectors of 8 samples (VSIZE) each. Each vector is compared to the vectors stored in the CodeBook and the Index of the Code Vector that is closest to the signal vector is selected. The CodeBook consists of 512 entries (512 addresses). The index chosen has the least difference according to the following minimization formula:

$$\text{Min}\left\{ \sum_{i=0}^{VSIZE-1} (x_i - y_i)^2 \right\}$$

where $x_i$=the input vector of VSIZE samples (8 for the 9.6 Kbit/sec algorithm), and $y_i$=the code book vector of VSIZE samples (8 for the 9.6 Kbit/sec algorithm).

The minimization computation, to find the best match between the subsegment and the code book entries is computationally intensive. A brute force comparison may exceed the available machine cycles if real time processing is to be accomplished. Thus, some shorthand processing approaches are taken to reduce the computations required to find the best fit. The above formula can be computed in a shorthand fashion as follows.

By expanding out the above formula, some of the unnecessary terms may be removed and some fixed terms may be pre-computed:

$$(x_i - y_i)^2 = (x_i - y_i) * (x_i - y_i)$$
$$= (x_i^2 - x_i y_i - x_i y_i + y_i^2)$$
$$= (x_i^2 - 2x_i y_i + y_i^2)$$

where $x_i^2$ is a constant so it may be dropped from the formula, and the value of $-\frac{1}{2} \Sigma y_i^2$ may be precomputed and stored as the VSIZE+1th value (8+1=9th value for the 9.6 Kbit/sec algorithm) in the code book so that the only real-time computation involved is the following formula:

$$\text{Min} \left\{ \sum_{i=0}^{VSIZE-1} (x_i - y_{ii}) \right\}$$

Thus, for a segment of Sub-Block Size samples (32 for the 9.6 Kbit/sec algorithm), we will transmit Sub-Block Size/ VSIZE CodeBook indices (4 CodeBook Indices, 9 bits each, for the 9.6 Kbit/sec algorithm). Therefore, for the 9.6 Kbit/sec algorithm, for each Sub-Block Size segment we will transmit 36 bits representing that segment.

After the appropriate index into the code book is chosen, the input speech samples are replaced by the corresponding vectors in the chosen indexes. These values are then multiplied by the $G_q$ to denormalize the synthesized error signal, e'(n). This signal is then passed through the Inverse Pitch Filter to reintroduce the Pitch effects that was taken out by the Pitch filter. The Inverse Pitch Filter is performed as follows:

$$y(n) = e'(n) + \beta_q * x'(n-j)$$

where $\beta_q$ is the Quantized LTP-Gain from Table 16, and j is the Lag.

The Inverse Pitch Filter output is used to update the synthesized speech buffer which is used for the analysis of the next sub-segment. The update of the state buffer is as follows:

$$x'(k) = x'(k + MIN\_PITCH)$$

where k=0, ..., (MAX_PITCH–MIN_PITCH)–1

$$x'(l) = y(n)$$

where l=MAX_PITCH–MIN_PITCH, ..., MAX_PITCH–1

The signal is then passed through the deemphasis filter since preemphasis was performed at the beginning of the processing. In the analysis, only the preemphasis state is updated so that we properly satisfy the Analysis-by-Synthesis method of performing the compression. In the Synthesis, the output of the deemphasis filter, s'(n), is passed on to the D/A to generate analog speech. The deemphasis filter is implemented as follows:

$$s'(n) = y(n) + p * s'(n-1)$$

where p=0.5 for the 9.6 Kbit/sec algorithm

Figure 5:
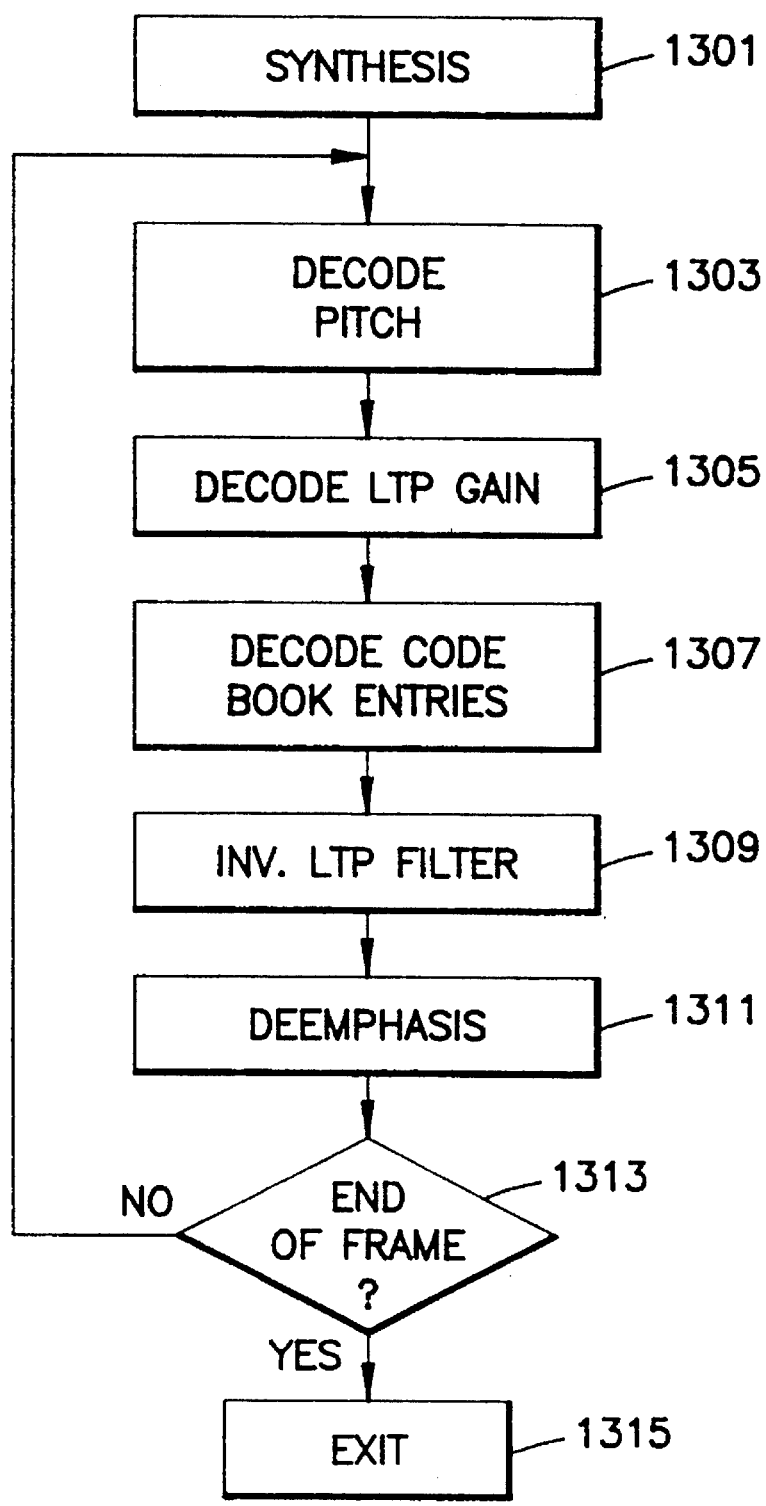
FIG. 5 is a signal flow diagram of the speech compression algorithm.

The voice is reconstructed at the receiving end of the voice-over data link according to the reverse of the compression algorithm as shown as the decompression algorithm in FIG. 5.

If a silence frame is received, the decompression algorithm simply discards the received frame and initialize the output with zeros. If a speech frame is received, the pitch, LTP-Gain and GAIN are decoded as explained above. The error signal is reconstructed from the codebook indexes, which is then denormalized with respect to the GAIN value. This signal is then passed through the Inverse filter to generate the reconstructed signal. The Pitch and the LTP-Gain are the decoded values, same as those used in the Analysis. The filtered signal is passed through the Deemphasis filter whose output is passed on to the D/A to put out analog speech.

The compressed frame contains 23 8-bit words and one 6-bit word. Thus a total of 24 words. Total number of bits transferred is 190, which corresponds to 9500 bps as shown in Table 19 (for the 9.6 Kbit/sec algorithm).

TABLE 19

Compressed Frame Packet for 9.6Kbit/sec Algorithm

| 7 | 6 | 5 | 4 | 3 | 2 | 1 | 0 | Bit Number |
|---|---|---|---|---|---|---|---|---|
| S | S | $p_0^5$ | $p_0^4$ | $p_0^3$ | $p_0^2$ | $p_0^1$ | $p_0^0$ | Comp_Frame[0] |
| $V_2^8$ | $V_1^8$ | $V_0^8$ | $p_1^4$ | $p_1^3$ | $p_1^2$ | $p_1^1$ | $p_1^0$ | Comp_Frame[1] |
| $V_5^8$ | $V_4^8$ | $V_3^8$ | $p_2^4$ | $p_2^3$ | $p_2^2$ | $p_2^1$ | $p_2^0$ | Comp_Frame[2] |
| $V_7^8$ | $V_6^8$ | $p_3^5$ | $p_3^4$ | $p_3^3$ | $p_3^2$ | $p_3^1$ | $p_3^0$ | Comp_Frame[3] |
| $V_9^8$ | $V_8^8$ | $BG_0^5$ | $BG_0^4$ | $BG_0^3$ | $BG_0^2$ | $BG_0^1$ | $BG_0^0$ | Comp_Frame[4] |
| $V_{11}^8$ | $V_{10}^8$ | $BG_1^5$ | $BG_1^4$ | $BG_1^3$ | $BG_1^2$ | $BG_1^1$ | $BG_1^0$ | Comp_Frame[5] |
| $V_{13}^8$ | $V_{12}^8$ | $BG_2^5$ | $BG_2^4$ | $BG_2^3$ | $BG_2^2$ | $BG_2^1$ | $BG_2^0$ | Comp_Frame[6] |
| $V_{15}^8$ | $V_{14}^8$ | $BG_3^5$ | $BG_3^4$ | $BG_3^3$ | $BG_3^2$ | $BG_3^1$ | $BG_3^0$ | Comp_Frame[7] |
| $VQ_0^7$ | $VQ_0^6$ | $VQ_0^5$ | $VQ_0^4$ | $VQ_0^3$ | $VQ_0^2$ | $VQ_0^1$ | $VQ_0^0$ | Comp_Frame[8] = LS 8 bits VQ[0] |
| $VQ_1^7$ | $VQ_1^6$ | $VQ_1^5$ | $VQ_1^4$ | $VQ_1^3$ | $VQ_1^2$ | $VQ_1^1$ | $VQ_1^0$ | Comp_Frame[9] = LS 8 bits VQ[1] |
| $VQ_{14}^7$ | $VQ_{14}^6$ | $VQ_{14}^5$ | $VQ_{14}^4$ | $VQ_{14}^3$ | $VQ_{14}^2$ | $VQ_{14}^1$ | $VQ_{14}^0$ | Comp_Frame[22] LS 8 bits VQ[14] |
| $VQ_{15}^7$ | $VQ_{15}^6$ | $VQ_{15}^5$ | $VQ_{15}^4$ | $VQ_{15}^3$ | $VQ_{15}^2$ | $VQ_{15}^1$ | $VQ_{15}^0$ | Comp_Frame[23] LS 8 bits VQ[15] | where BG = Beta/Gain, P = Pitch, VQ = CodeBook Index and S = Spare Bits

Code Book Descriptions

The code books used for the VQ algorithm described above are attached as Appendices A, B and C. Appendix A includes the code book data for the 8 Kbit/sec algorithm, Appendix B includes the code book data for the 9.6 Kbit/sec algorithm and Appendix C includes the code book data for the 16 Kbit/sec algorithm. Table 20 describes the format of the code book for the 9.6 Kbit/sec algorithm. The code book values in the Appendices are stored in a signed floating point format which is converted to a fixed point representation of floating point number when stored in the lookup tables of the present invention. There are 512 entries in each code book corresponding to 512 different speech segments which can be used to encode and reconstruct the speech.

TABLE 20

Code Book Format for the 9.6Kbit/sec Algorithm

| —— Code Book Entries —— | — 1/2 Sum² Constant — |
|---|---|
| 8 entries | 1 entry |

For the 9.6 Kbit/sec algorithm, the code book comprises a table of nine columns and 512 rows of floating point data. The first 8 rows correspond to the 8 samples of speech and the ninth entry is the precomputed constant described above as $-\frac{1}{2} \Sigma y_i^2$. An example of the code book data is shown in Table 21 with the complete code book for the 9.6 Kbit/sec algorithm described in Appendix B.

TABLE 21

Code Book Example for the 9.6Kbit/sec Algorithm

| 0.786438 | 1.132875 | 1.208375 | 1.206750 | 1.114250 | 0.937688 | 0.772062 | 0.583250 | 3.93769 |
| 0.609667 | 1.019167 | 0.909167 | 0.957750 | 0.999833 | 0.854333 | 1.005667 | 0.911250 | 3.36278 |
| 0.614750 | 1.150750 | 1.477750 | 1.548750 | 1.434750 | 1.304250 | 1.349750 | 1.428250 | 6.95291 |
| 0.657000 | 1.132909 | 1.279909 | 1.204727 | 1.335636 | 1.280818 | 1.162000 | 0.958818 | 5.24933 |
| 0.592429 | 0.897571 | 1.101714 | 1.337286 | 1.323571 | 1.349000 | 1.304857 | 1.347143 | 5.6239 |
| 0.325909 | 0.774182 | 1.035727 | 1.263636 | 1.456455 | 1.356273 | 1.076273 | 0.872818 | 4.628 |

The code books are stored in PROM memory accessible by the Voice DSP as a lookup table. The table data is loaded into local DSP memory upon the selection of the appropriate algorithm to increase access speed. The code books comprise a table of data in which each entry is a sequential address from 000 to 511. For the 9.6 Kbit/sec algorithm, a 9×512 code book is used. For the 16 Kbit/sec algorithm, a 6×256 code book is used and for the 8 Kbit/sec algorithm, a 9×512 code book is used. Depending upon which voice compression quality and compression rate is selected, the corresponding code book is used to encode/decode the speech samples.

Generation of the Code Books

The code books are generated statistically by encoding a wide variety of speech patterns. The code books are generated in a learning mode for the above-described algorithm in which each speech segment which the compression algorithm is first exposed to is placed in the code book until 512 entries are recorded. Then the algorithm is continually fed a variety of speech patterns upon which the code book is adjusted. As new speech segments are encountered, the code book is searched to find the best match. If the error between the observed speech segment and the code book values exceed a predetermined threshold, then the closest speech segment in the code book and the new speech segment is averaged and the new average is placed in the code book in place of the closest match. In this learning mode, the code book is continually adjusted to have the lowest difference ratio between observed speech segment values and code book values. The learning mode of operation may take hours or days of exposure to different speech patterns to adjust the code books to the best fit.

The code books may be exposed to a single person's speech which will result in a code book being tailored to that particular persons method of speaking. For a mass market sale of this product, the speech patterns of a wide variety of speakers of both genders are exposed to the code book learning algorithm for the average fit for a given language. For other languages, it is best to expose the algorithm to speech patterns of only one language such as English or Japanese.

Voice Over Data Packet Protocol

As described above, the present system can transmit voice data and conventional data concurrently by using time multiplex technology. The digitized voice data, called V-data carries the speech information. The conventional data is referred to as C-data. The V-data and C-data multiplex transmission is achieved in two modes at two levels: the transmit and receive modes and data service level and multiplex control level. This operation is shown diagrammatically in FIG. 7.

In transmit mode, the main controller circuit 313 of FIG. 2 operates in the data service level 1505 to collect and buffer data from both the personal computer 10 (through the RS232 port interface 315) and the voice control DSP 306. In multiplex control level 1515, the main controller circuit 313 multiplexes the data and transmits that data out over the phone line 1523. In the receive mode, the main controller circuit 313 operates in the multiplex control level 1515 to de-multiplex the V-data packets and the C-data packets and then operates in the data service level 1505 to deliver the appropriate data packets to the correct destination: the personal computer 10 for the C-data packets or the voice control DSP circuit 306 for V-data.

Transmit Mode

In transmit mode, there are two data buffers, the V-data buffer 1511 and the C-data buffer 1513, implemented in the main controller RAM 316 and maintained by main controller 313. When the voice control DSP circuit 306 engages voice operation, it will send a block of V-data every 20 ms to the main controller circuit 313 through dual port RAM circuit 308. Each V-data block has one sign byte as a header and 24 bytes of V-data.

The sign byte header of the voice packet is transferred every frame from the voice control DSP to the controller 313. The sign byte header contains the sign byte which identifies the contents of the voice packet. The sign byte is defined as follows:

00 hex=the following V-data contains silent sound 01 hex=the following V-data contains speech information If the main controller 313 is in transmit mode for V-data/C-data multiplexing, the main controller circuit 313 operates at the data service level to perform the following tests. When the voice control DSP circuit 306 starts to send the 24-byte V-data packet through the dual port RAM to the main controller circuit 313, the main controller will check the V-data buffer to see if the buffer has room for 24 bytes. If there is sufficient room in the V-data buffer, the main controller will check the sign byte in the header preceding the V-data packet. If the sign byte is equal to one (indicating voice information in the packet), the main controller circuit 313 will put the following 24 bytes of V-data into the V-data buffer and clear the silence counter to zero. Then the main controller 313 sets a flag to request that the V-data be sent by the main controller at the multiplex control level.

If the sign byte is equal to zero (indicating silence in the V-data packet), the main controller circuit 313 will increase the silence counter by 1 and check if the silence counter has reached 5. When the silence counter reaches 5, the main controller circuit 313 will not put the following 24 bytes of V-data into the V-data buffer and will stop increasing the silence counter. By this method, the main controller circuit 313 operating at the service level will only provide non-silence V-data to the multiplex control level, while discarding silence V-data packets and preventing the V-data buffer from being overwritten.

The operation of the main controller circuit 313 in the multiplex control level is to multiplex the V-data and C-data packets and transmit them through the same channel. At this control level, both types of data packets are transmitted by the HDLC protocol in which data is transmitted in synchronous mode and checked by CRC error checking. If a V-data packet is received at the remote end with a bad CRC, it is discarded since 100% accuracy of the voice channel is not ensured. If the V-data packets were re-sent in the event of corruption, the real-time quality of the voice transmission would be lost. In addition, the C-data is transmitted following a modem data communication protocol such as CCITT V.42.

In order to identify the V-data block to assist the main controller circuit 313 to multiplex the packets for transmission at his level, and to assist the remote site in recognizing and de-multiplexing the data packets, a V-data block is defined which includes a maximum of five V-data packets. The V-data block size and the maximum number of blocks are defined as follows:

The V-data block header=80 h;

The V-data block size=24;

The maximum V-data block size=5;

The V-data block has higher priority to be transmitted than C-data to ensure the integrity of the real-time voice transmission. Therefore, the main controller circuit 313 will check the V-data buffer first to determine whether it will transmit V-data or C-data blocks. If V-data buffer has V-data of more than 69 bytes, a transmit block counter is set to 5 and the main controller circuit 313 starts to transmit V-data from the V-data buffer through the data pump circuit 311 onto the telephone line. Since the transmit block counter indicates 5 blocks of V-data will be transmitted in a continuous stream, the transmission will stop either at finish the 115 bytes of V-data or if the V-data buffer is empty. If V-data buffer has V-data with number more than 24 bytes, the transmit block counter is set 1 and starts transmit V-data. This means that the main controller circuit will only transmit one block of V-data. If the V-data buffer has V-data with less than 24 bytes, the main controller circuit services the transmission of C-data.

During the transmission of a C-data block, the V-data buffer condition is checked before transmitting the first C-data byte. If the V-data buffer contains more than one V-data packet, the current transmission of the C-data block will be terminated in order to handle the V-data.

Receive Mode

On the receiving end of the telephone line, the main controller circuit 313 operates at the multiplex control level to de-multiplex received data to V-data and C-data. The type of block can be identified by checking the first byte of the incoming data blocks. Before receiving a block of V-data, the main controller circuit 313 will initialize a receive V-data byte counter, a backup pointer and a temporary V-data buffer pointer. The value of the receiver V-data byte counter is 24, the value of the receive block counter is 0 and the backup pointer is set to the same value as the V-data receive buffer pointer. If the received byte is not equal to 80 hex (80 h indicating a V-data packet), the receive operation will follow the current modem protocol since the data block must contain C-data. If the received byte is equal to 80 h, the main controller circuit 313 operating in receive mode will process the V-data. For a V-data block received, when a byte of V-data is received, the byte of V-data is put into the V-data receive buffer, the temporary buffer pointer is increased by 1 and the receive V-data counter is decreased by 1. If the V-data counter is down to zero, the value of the temporary V-data buffer pointer is copied into the backup pointer buffer. The value of the total V-data counter is added with 24 and the receive V-data counter is reset to 24. The value of the receive block counter is increased by 1. A flag to request service of V-data is then set. If the receive block counter has reached 5, the main controller circuit 313 will not put the incoming V-data into the V-data receive buffer but throw it away. If the total V-data counter has reached its maximum value, the receiver will not put the incoming V-data into the V-data receive buffer but throw it away.

At the end of the block which is indicated by receipt of the CRC check bytes, the main controller circuit 313 operating in the multiplex control level will not check the result of the CRC but instead will check the value of the receive V-data counter. If the value is zero, the check is finished, otherwise the value of the backup pointer is copied back into the current V-data buffer pointer. By this method, the receiver is insured to de-multiplex the V-data from the receiving channel 24 bytes at a time. The main controller circuit 313 operating at the service level in the receive mode will monitor the flag of request service of V-data. If the flag is set, the main controller circuit 313 will get the V-data from the V-data buffer and transmit it to the voice control DSP circuit 306 at a rate of 24 bytes at a time. After sending a block of V-data, it decreases 24 from the value in the total V-data counter.

Negotiation of Voice Compression Rate

The modem hardware component 20 incorporates a modified packet protocol for negotiation of the speech compression rate. A modified supervisory packet is formatted using the same open flag, address, CRC, and closing flag formatting bytes which are found in the CCITT V.42 standard data supervisory packet, as is well known in the industry and as is described in the CCITT Blue Book, volume VIII entitled *Data Communication over the Telephone Network*, 1989 referenced above. In the modified packet protocol embodiment, the set of CCITT standard header bytes (control words) has been extended to include nonstandard control words used to signal transmission of a nonstandard communication command. The use of a nonstandard control word does not conflict with other data communication terminals, for example, when communicating with a non-PCS (Personal Communications System) modem system, since the nonstandard packet will be ignored by a non-PCS system.

Table 22 offers one embodiment of the present invention showing a modified supervisory packet structure. Table 22 omits the CCITT standard formatting bytes: open flag, address, CRC, and closing flag; however, these bytes are described in the CCITT standard. The modified supervisory packet is distinguished from a V.42 standard packet by using a nonstandard control word, such as 80 hex, as the header. The nonstandard control word does not conflict with V.42 standard communications.

TABLE 22

Modified Supervisory Packet Structure

| 80h | ID | LI | ACK | data | data | — | — | — | data |
|-----|----|----|-----|------|------|---|---|---|------|

The modified supervisory packet is transmitted by the HDLC protocol in which data is transmitted in synchronous mode and checked by CRC error checking. The use of a modified supervisory packet eliminates the need for an escape command sent over the telephone line to interrupt data communications, providing an independent channel for negotiation of the compression rate. The channel may also be used as an alternative means for programming standard communications parameters.

The modified supervisory packet is encoded with different function codes to provide an independent communications channel between hardware components. This provides a means for real time negotiation and programming of the voice compression rate during uninterrupted transmission of voice data and conventional data without the need for conventional escape routines. The modified supervisory packet is encoded with a function code using several embodiments. For example, in one embodiment, the function code is embedded in the packet as one of the data words and is located in a predetermined position. In an alternate embodiment, the supervisory packet header signals a nonstandard supervisory packet and contains the compression rate to be used between the sites. In such an embodiment, for example, a different nonreserved header is assigned to each function code. These embodiments are not limiting and other methods known to those skilled in the art may be employed to encode the function code into the modified supervisory packet.

Referring once again to FIG. 1, a system consisting of PCS modem 20 and data terminal 10 are connected via phone line 30 to a second PCS system comprised of PCS modem 20A and data terminal 10A. Therefore, calling modem 20 initializes communication with receiving modem 20A. In one embodiment of the present invention, a speech compression command is sent via a modified supervisory data packet as the request for speech compression algorithm and ratio negotiation. Encoded in the speech compression command is the particular speech compression algorithm and the speech compression ratio desired by the calling PCM modem 20. Several methods for encoding the speech compression algorithm and compression ratio exist. For example, in embodiments where the function code is embedded in the header byte, the first data byte of the modified supervisory packet could be used to identify the speech compression algorithm using a binary coding scheme (e.g., 00 h for Vector Quantization, 01 h for CELP+, 02 h for VCELP, and 03 h for TrueSpeech, etc.). A second data byte could be used to encode the speech compression ratio (e.g., 00 h for 9.6 Kbit/sec, 01 h for 16 Kbit/sec, 02 h for 8 Kbit/sec, etc.). This embodiment of the speech compression command supervisory packet is shown in Table 23.

TABLE 23

Speech Compression Command Supervisory Packet

| 80h | ID | LI | ACK | Algthm | CRatio | — | — | — | data |
|-----|----|----|-----|--------|--------|---|---|---|------|

Alternatively, as stated above, the function code could be stored in a predetermined position of one of the packet data bytes. Other function code encoding embodiments are possible without deviating from the scope and spirit of the present invention and the embodiments offered are not intended to be exclusive or limiting embodiments.

In either case, the receiving PCS modem 20A will recognize the speech compression command and will respond with an acknowledge packet using, for instance, a header byte such as hex 81. The acknowledge packet will alert the calling modem 20 that the speech compression algorithm and speech compression ratio selected are available by use of the ACK field of the supervisory packet shown in Table 23. Receipt of the acknowledge supervisory packet causes the calling modem 20 to transmit subsequent voice over data information according to the selected speech compression algorithm and compression ratio.

The frequency of which the speech compression command supervisory packet is transmitted will vary with the application. For moderate quality voice over data applications, the speech compression algorithm need only be negotiated at the initialization of the phone call. For applications requiring more fidelity, the speech compression command supervisory packet is renegotiated throughout the call to accommodate new parties to the communication which have different speech compression algorithm limitations or to actively tune the speech compression ratio as the quality of the communications link fluctuates.

Other embodiments provide a speech compression command supervisory packet encode varying transmission rates of the speech compression command supervisory packet and different methods of speech compression algorithm and compression ratio negotiation. Additionally, other encoding embodiments to encode the supervisory packet speech compression algorithm and the speech compression ratio may be incorporated without deviating from the scope and spirit of the present invention, and the described embodiments are not exclusive or limiting.

A new supervisory packet may be allocated for use as a means for negotiating multiplexing scheme for the various types of information sent over the communications link. For example, if voice over data mode is employed, there exist several methods for multiplexing the voice and digital data. The multiplexing scheme may be selected by using a modified supervisory packet, called a multiplex supervisory packet, to negotiate the selection of multiplexing scheme.

Similarly, another supervisory packet could be designated for remote control of another hardware device. For example, to control the baud rate or data format of a remote modem, a remote control supervisory packet could be encoded with the necessary selection parameters needed to program the remote device.

Those skilled in the art will readily appreciate that there exist numerous other unidirectional and bidirectional communication and control applications in which the supervisory packet may be used. The examples given are not limiting, but are specific embodiments of the present invention offered for illustrative purposes.

The present inventions are to be limited only in accordance with the scope of the appended claims, since others skilled in the art may devise other embodiments still within the limits of the claims.

We claim:

1. A communication module for use with a personal computer, comprising:

communications interface means connected for communicating to the personal computer for transferring data between the personal computer and the communications module;

telephone line interface means for connection to a telephone line;

voice interface means for receiving local voice signals from a local user and for conveying remote voice signals from a remote user to the local user;

full-duplex conversion means connected to the voice interface means for converting the local voice signals into outgoing digital voice data and for converting incoming digital voice data into the remote voice signals;

digital signal processor means connected to the full-duplex conversion means for compressing the outgoing digital voice data into compressed outgoing digital voice data having one of a plurality of selectable compression rates and for decompressing compressed incoming digital voice data into the incoming digital voice data at one of said plurality of said selectable compression rates;

main control means connected for receiving the compressed outgoing digital voice data from the digital signal processor means, connected for receiving outgoing conventional digital data from the personal computer through the communications interface means, and operable for multiplexing the compressed outgoing digital voice data and the conventional digital data to produce multiplexed outgoing data; and the main control means further operable for receiving multiplexed incoming data which contains incoming conventional digital data multiplexed with the compressed incoming digital voice data, for demultiplexing the incoming conventional digital data and the compressed incoming digital voice data, and for sending the incoming conventional digital data to the personal computer through the communications interface means and for sending the compressed incoming digital voice data to the digital signal processor means; and the main control means further operable for negotiating the compression rate at various times during the transmission of conventional digital data multiplexed with the compressed digital voice data to change the compression rate.

2. The module according to claim 1 wherein the digital signal processor means is further operable for compressing the outgoing digital voice data into compressed outgoing digital voice data by performing the steps of:

a.) removing any DC bias in the outgoing digital voice data to produce a normalized outgoing digital voice signal;

b.) pre-emphasizing the normalized outgoing digital voice signal to produce a pre-emphasized outgoing digital voice signal;

c.) dividing the pre-emphasized outgoing digital voice signal into segments to produce a current segment and a past segment;

d.) predicting the pitch of the current speech segment to form a pitch prediction;

e.) calculating the gain of the pitch of the current speech segment to form a prediction gain;

e.) reconstructing the past speech segment from a compressed past segment to produce a reconstructed past segment;

f.) finding the innovation in the current speech segment by comparing the pitch prediction to the reconstructed past segment to produce an error signal;

g.) determining the maximum amplitude in the current speech segment;

h.) quantizing the error signal using one of a plurality of code books, each code book corresponding to a different compression rate, the code books being generated from a representative set of speakers and environments to produce a minimum mean squared error matching the form of an index into said one of said plurality of code book; and i.) recording the pitch prediction, the prediction gain, the maximum amplitude and the index into the selected code book in a packet as the compressed outgoing digital voice data.

3. The module according to claim 1 wherein the digital signal processor means is further operable for detecting silent periods in the outgoing digital voice data and for producing in response thereto a silence flag and wherein the main control means is further operable for transmitting outgoing conventional digital data on the telephone line when the silence flag indicates the absence of voice information and wherein the main control means is further operable for multiplexing and transmitting both the compressed outgoing digital voice data and the outgoing conventional digital data on the telephone line when the silence flag indicates the presence of voice information.

4. A system for performing voice compression, comprising:

voice interface means including a voice input device for receiving voice signals from a user;

conversion means for converting the voice signals into digital voice data;

means for dividing the digital voice signal into segments and for serially producing therefrom a current voice segment and a past voice segment;

means for determining the predicted gain of the current voice segment;

means for determining the pitch values of the current voice segment;

coding means for predictive coding on the current voice segment by predicting the current voice segment as best as possible based on past recreated voice segments and for producing a difference signal value in response thereto;

means for selecting a compression rate for the speech compression;

means including a plurality of code books stored in a memory for comparing the difference signal value to stored difference values stored one of the plurality of code books stored in the memory and for locating the memory address of the closest match between the difference signal value and the stored difference values;

output means for providing a compression packet for each of the segments, the packet including the memory address of the closest match between the difference signal value and the stored difference values, the predicted gain and the pitch values for each voice segment; and output means further for providing a negotiation packet sent to determine the compression rate.

* * * * *